United States Patent
Poon

(10) Patent No.: US 8,775,418 B2
(45) Date of Patent: Jul. 8, 2014

(54) METHOD FOR SOCIAL SEARCH

(76) Inventor: Roger J. Poon, Covington, WA (US)

( * ) Notice: Subject to any disclaimer, the term of this patent is extended or adjusted under 35 U.S.C. 154(b) by 0 days.

(21) Appl. No.: 13/551,503

(22) Filed: Jul. 17, 2012

(65) Prior Publication Data

US 2013/0036112 A1 Feb. 7, 2013

Related U.S. Application Data

(60) Provisional application No. 61/508,876, filed on Jul. 18, 2011, provisional application No. 61/514,963, filed on Aug. 4, 2011.

(51) Int. Cl.
*G06F 7/00* (2006.01)
*G06F 17/30* (2006.01)
*G06Q 50/00* (2012.01)

(52) U.S. Cl.
CPC .......... *G06F 17/30864* (2013.01); *G06Q 50/01* (2013.01)
USPC ........................................................ 707/723

(58) Field of Classification Search
None
See application file for complete search history.

(56) References Cited

U.S. PATENT DOCUMENTS

| | | | |
|---|---|---|---|
| 8,234,195 B1 * | 7/2012 | Berhanu et al. | 705/35 |
| 2007/0106627 A1 * | 5/2007 | Srivastava et al. | 706/20 |
| 2008/0082548 A1 * | 4/2008 | Betts | 707/10 |
| 2009/0024548 A1 | 1/2009 | Zhu et al. | |
| 2009/0204601 A1 | 8/2009 | Grasset | |
| 2010/0088314 A1 | 4/2010 | Kuang | |
| 2010/0121849 A1 | 5/2010 | Goeldi | |
| 2011/0106850 A1 * | 5/2011 | Li et al. | 707/780 |

OTHER PUBLICATIONS

Black, "Graph" 26 Dec. 12, National Institute of Standards and Technology, http://xlinux.nist.gov/dads/HTML/graph.html.*
International Search Report and Written Opinion received in International Application No. PCT/US2012/047083, dated Dec. 18, 2012, 10 pages.

* cited by examiner

*Primary Examiner* — Jason Liao
(74) *Attorney, Agent, or Firm* — Davis Wright Tremaine LLP; Heather M. Colburn

(57) ABSTRACT

System and methods for performing social searches using a social graph including nodes associated with voting values associated with items of interest. At least one rating (such as importance rating, compatibility rating, proximity rating, and/or social rank value) is obtained for each node. A web search obtains search results. A sort value (for sorting the search results) is determined for each search result in which an item is identified. The sort value may be determined for a search result by (a) identifying nodes associated with a voting value that is associated with an item identified in the search result, (b) determining a node value for each node identified based on the rating obtained for the node and the voting value associated with both the node and the item(s) identified in the search result, and (c) determining the sort value based on the node values of the nodes identified.

15 Claims, 16 Drawing Sheets

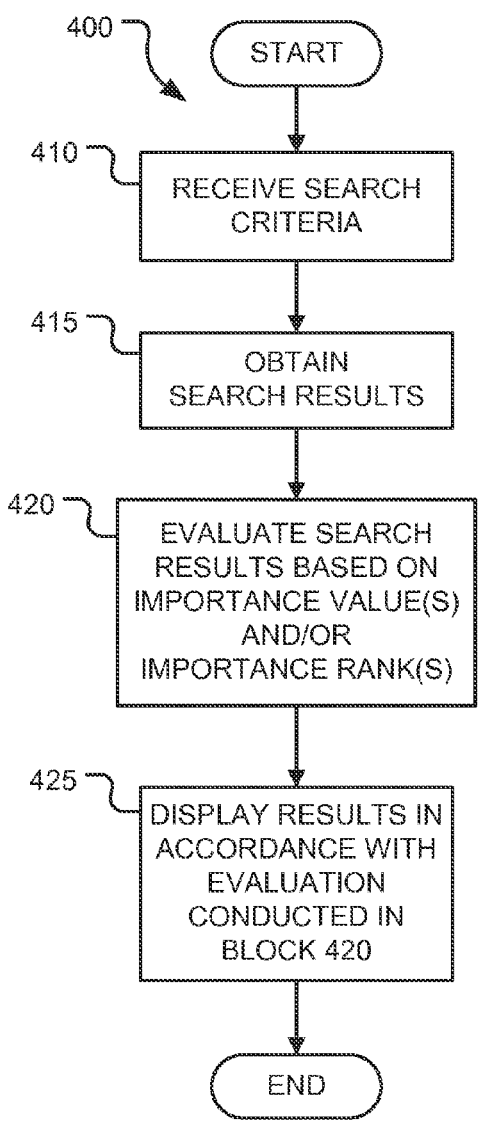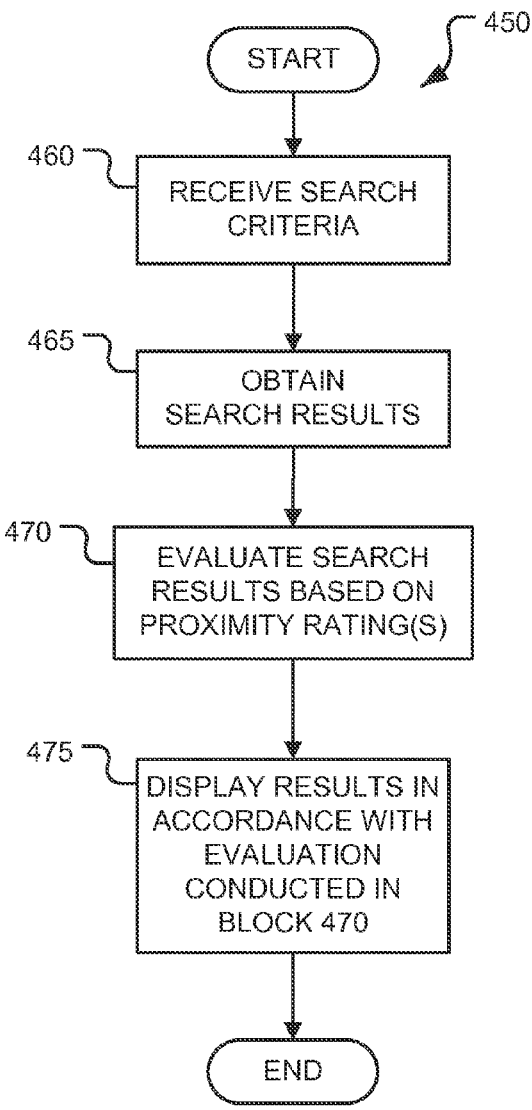
FIGURE 5A
FIGURE 5B

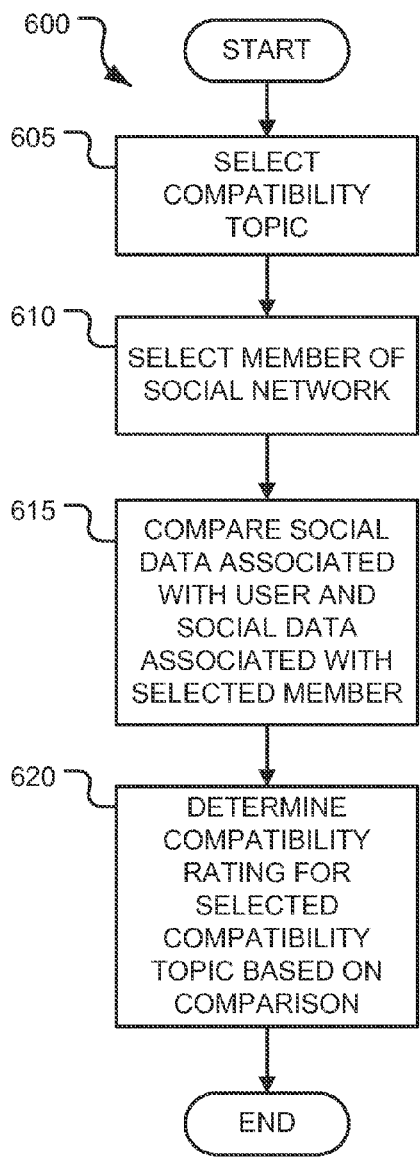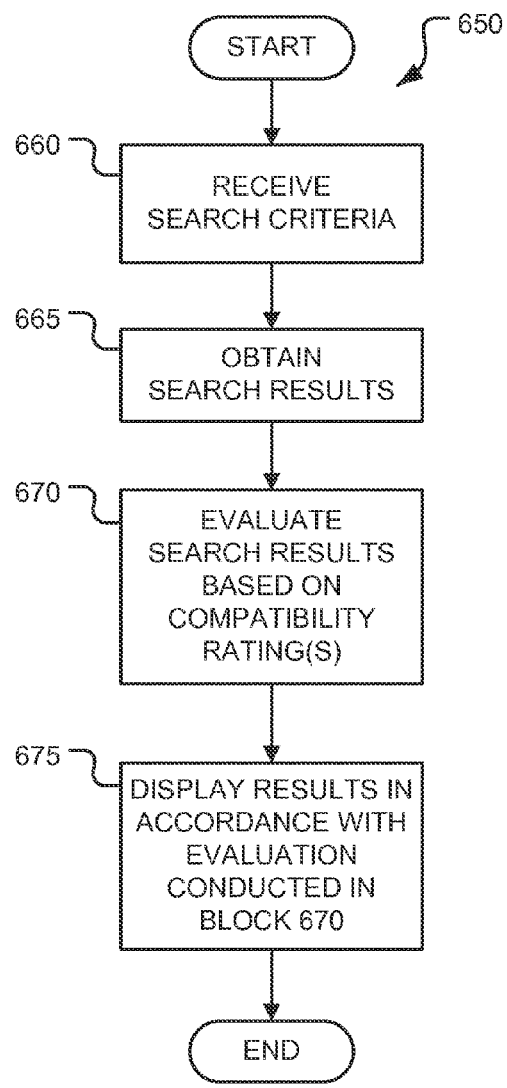
FIGURE 8A
FIGURE 8B

METHOD FOR SOCIAL SEARCH

CROSS REFERENCE TO RELATED APPLICATION(S)

This application claims the benefit of U.S. Provisional Application No. 61/508,876, filed on Jul. 18, 2011, and U.S. Provisional Application No. 61/514,963, filed on Aug. 4, 2011 both of which are incorporated herein by reference in their entireties.

BACKGROUND OF THE INVENTION

1. Field of the Invention

The present invention is directed generally to methods of performing social searches and web searches involving the use of data from social networks and social graphs.

2. Description of the Related Art

The term "social graph" is familiar to those of ordinary skill in the art and was coined by scientists working in social areas of graph theory. The term "social graph" has been described as a global mapping of everybody and how they are related to one another.

Some online service providers collect, generate, and store information about users in a structure referred to as a social graph. The social graph may be stored in one or more data structures. In some implementations, the social graph is stored in a database. As is apparent to those of ordinary skill in the art, a graph includes nodes connected together by links. While implementations of a social graph may vary, generally speaking, in a social graph, users (which may include entities) are represented by nodes and relationships between the nodes are represented by links. For example, a first user may identify a second user as a "friend." In this example, the first user may be represented by a first node, the second user may be represented by a second node, and the "friend" relationship may be represented by a link (e.g., having a type "friend"). The link may be one-way indicating the second user is a "follower" of the first user, but not indicating the first user is also "following" or "followed by" the second user. If the second user has indicated the first user is a "friend," the link between the first and second users may indicate a two-way (or mutual) "friend" relationship exists between the first and second nodes. A link may exist even if the first and second users are unfamiliar with each other. Furthermore, a link may exist if the first user is familiar with the second user, but the second user is not familiar with the first user. In another example, a link may exist if the second user is familiar with the first user, but the first user is not familiar with the second user. A link may identify other types of relationships (other than a "friend" relationship). For example, a link may identify a "contact" relationship, an "acquaintance" relationship, a business relationship, a work relationship, and the like.

FIG. 1 provides an illustration of a social graph 10 including the Users A-J. The social graph 10 may be characterized as being associated with the User A (or as being User A's social graph). In the social graph 10, the User A has a mutual relationship with the User B and a one-way relationship with each of the Users C-E. Thus, in this example, the Users A and B may be "following" each other. Further, the User A may be "following" each of the Users C-E, while none of the Users C-E are following the User A. Therefore, the User A may be classified as a "follower" of the Users B-E.

As is also apparent to those of ordinary skill in the art, methods exist for traversing and searching a social graph, such as the social graph 10.

Each user may be characterized as having a social graph. The social graph 10 illustrated in FIG. 1 is associated with the User A and shows connections between the User A and the Users B-J. However, depending upon the implementation details, the social graphs of at least a portion of the users may be connected such that they form a single social graph. A social graph may be characterized as storing information about a user on a "social network."

Within the social graph, a particular user (represented by a node) may be connected directly to one or more nodes. Such a direct connection is often referred to as a first degree connection. In FIG. 1, the Users B-E have first degree connections with the User A.

A second degree connection includes nodes connected directly to the nodes of the first degree connection (other than the node representing the particular user). In FIG. 1, the Users F, H, and I have second degree connections with the User A. Further, because a mutual connection exists between the nodes representing the Users C and D, each of the Users C and D also has a second degree connection with the User A.

A third degree connection includes nodes connected directly to the nodes of the second degree connection (other than the nodes of the first degree connection), and so forth. In FIG. 1, the User G has a third degree connection with the User A.

Further, nodes may be connected to the social graph 10 from other social graphs. For example, a node representing the User J is connected to the node representing the User C via a one-way relationship indicating the User J is following the User C. Thus, the node representing the User J is not actually part of the social graph 10 but is connected thereto.

Social search or a social search engine is a type of web search that takes into account information stored in at least a portion of a social graph associated with the user who is running a search query. The information stored in the social graph may be used by the social search to determine relevance of the results obtained by the web search.

There are currently a number of companies that offer products that attempt to provide social search. However, none of the currently available technologies provide truly relevant search results. Further, many of the currently available technologies are easily manipulated.

As is apparent to those of ordinary skill in the art, some online service providers allow users to indicate preferences or opinions related to items of interest (e.g., goods, services, locations, etc.). For example, some service providers allow users to indicate they "like" a particular item of interest. If a user has indicated the user "likes" a particular item of interest, the user has indicated a positive opinion related to that item, which may be considered a "vote" for the item. Thus, by "liking" an item of interest, the user has "voted up" that item.

A popular approach to social search is to use at least a portion of a social graph related to a particular user executing the search query to identify a portion of the nodes of the social graph. For example, the social search may identify nodes representing the user's friends, the user's contacts, and/or anyone. Then, the social search determines how many "votes" each of the search results (e.g., websites, content, files, and/or data) has obtained from the nodes identified. The number of votes received from the nodes identified may be used to select which search results to display or determine how the search results are to be displayed (e.g., used to determine a sort order) to the user. This method has some problems. For example, because it is difficult to determine whether a particular node (e.g., a node representing a "friend") has the same tastes and preferences as the user executing the social search, the method may not return particularly relevant search results or order them a particularly useful way. This method also does not help determine whether the particular node is legitimate, has expertise in the area(s) in which the node is voting, etc. Thus, using the number of votes received from the nodes identified to select or display the search results may not yield desirable search results for the user executing the social search.

Additionally, current social search technologies are prone to types of abuse in which the search results are manipulated. A spammer is typically a person or other type of entity that sends unwanted messages, emails, friend requests, votes, etc. (often in bulk) to other users. However, the term "spammer" may also describe person or other type of entity that manipulates or takes advantage of a social networking service and/or web search service in an inappropriate, abusive, and/or illegal manner. Often, these activities are in violation of a user agreement between the spammer and the social networking service.

An example of a type of inappropriate activity sometimes engaged in by a spammer includes manipulating a user's search results obtained via a social search. A spammer may manipulate some types of social search by executing a program (typically referred to as a robot) that automatically adds nodes (e.g., representing users) to the spammer's social graph linked to the spammer as "friends." The spammer may then "vote up" search results that benefit the spammer. By "voting up" selected search results, the spammer manipulates the search results for all of the spammer's "friends" in the social graph. Some of these "friends" may include legitimate users who added the spammer to their social graphs (e.g., via a friends list) simply to increase their number of friends (referred to as a friends count).

Thus, social search technologies available today are largely ineffective and provide irrelevant results that can easily be manipulated. Therefore, a need exists for methods of implementing a social search that provide personalized and/or relevant search results to a user. Methods that are difficult to manipulate would be particularly desirable. The present application provides these and other advantages as will be apparent from the following detailed description and accompanying figures.

SUMMARY OF THE INVENTION

Embodiments include methods and systems for conducting social searches. The methods and systems may be for use with data representing a social graph associated with a user. The social graph includes a plurality of nodes each associated with voting values associated with a plurality of items of interest. Each of the plurality of nodes represents a member (e.g., an entity) of a social network.

The methods are performed by one or more computing devices. Each of the methods sorts search results obtained by a web search based on user supplied search criteria. In other words, the search criteria is received from the user. Those search results in which at least one of the plurality of items of interest is identified are sorted based at least in part on one or more ratings (e.g., importance ratings, proximity ratings, compatibility ratings, and/or social rank values) assigned to the nodes of the social graph, and voting values associated with the nodes and the items of interest identified.

For example, one method includes obtaining an importance rating for each of the plurality of nodes. In this method, a sort value is determined for each of the search results in which at least one of the plurality of items of interest was identified. The sort value is determined for a particular search result by (1) identifying one or more nodes of the social graph associated with a voting value associated with any of the plurality of items of interest identified in the search result, (2) determining a node value for each node identified based at least in part on the importance rating obtained for the node and the voting value associated with both the node and any of the plurality of items of interest identified in the search result, and (3) determining the sort value for the search result based at least in part on the node value determined for each node identified. Then, the search results are ordered based at least in part on the sort value determined for each of the search results in which at least one of the plurality of items of interest was identified. A user interface may be generated that includes the ordered search results and is displayable to the user via a display device.

The importance rating may be obtained for each of at least a portion of the plurality of nodes by receiving input from the user. The input received from the user may include a numerical importance value for each of the plurality of nodes, and/or a node order that ranks the plurality of nodes in accordance with importance to the user. For each of at least a portion of the nodes, the input may be received from the user when the user accepts a friend request from an entity represented by the node, or sends a friend request to the entity represented by the node.

The importance rating may be obtained for each of at least a portion of the plurality of nodes by at least one of (1) pattern recognition performed on social data that is associated with the user, (2) pattern recognition performed on social data that is received by the user, and (3) pattern recognition performed on actions taken by the user.

The importance rating may be obtained for each of at least a portion of the plurality of nodes by at least one of (1) pattern recognition performed on social data that is associated with an entity represented by the node, (2) pattern recognition performed on social data that is received by the entity represented by the node, and (3) pattern recognition performed on actions taken by the entity represented by the node.

In addition to importance rating, the method may also use proximity rating obtained for each of the plurality of nodes. The proximity rating indicates at least one of (1) a distance between the node and the user on the social graph, or (2) a physical distance between an entity represented by the node and the user. In such embodiments, for each of the search results in which at least one of the plurality of items of interest was identified, the node value for each node identified is based at least in part on the proximity rating associated with the node.

In addition to importance rating and proximity rating, the method may also use compatibility rating obtained for each of the plurality of nodes based on an analysis of similarity between social data associated with the user and social data associated with the node. In such embodiments, for each of the search results in which at least one of the plurality of items of interest was identified, the node value for each node identified is based at least in part on the compatibility rating associated with the node.

Alternatively, in addition to importance rating and proximity rating, the method may also use a social rank value obtained for each of the plurality of nodes. In such embodiments, a type of subject matter is identified. The type of subject matter may be determined based on the search criteria. Alternatively, the type of subject matter may be determined based on social data associated with the user. If the type of subject matter is not determined based on the search criteria, a determination is made as to whether the search criteria is related to the type of subject matter. Each of at least a portion of the plurality of nodes is identified as being a followed node. A followed node is a node that is followed by at least one other of the plurality of nodes in the social graph. One or more of the plurality of nodes that are following the followed node are identified. Each followed node has a social rank value assigned to the followed node for the type of subject matter. For each followed node, social data associated with the one or more of the nodes following the followed node is analyzed to determine whether any of the one or more following nodes are interested in the type of subject matter. The social rank value assigned to the followed node for the type of subject matter is increased if it is determined that any of the one or more following nodes are interested in the type of subject matter. When it is determined that the search criteria is related to the type of subject matter (or the type of subject matter is determined based on the search criteria), for each of the search results in which at least one of the plurality of items of interest was identified, the node value for each node identified is based at least in part on the social rank value assigned to the node for the type of subject matter.

Alternatively, in addition to importance rating, the method may use a social rank value obtained for each of the plurality of nodes. In such embodiments, a type of subject matter is identified. The type of subject matter may be determined based on the search criteria. Alternatively, the type of subject matter may be determined based on social data associated with the user. If the type of subject matter is not determined based on the search criteria, a determination is made as to whether the search criteria is related to the type of subject matter. Each of at least a portion of the plurality of nodes is identified as being a followed node. A followed node is a node that is followed by at least one other of the plurality of nodes in the social graph. One or more of the plurality of nodes that are following the followed node are identified. Each followed node has a social rank value assigned to the followed node for the type of subject matter. For each followed node, social data associated with the one or more of the nodes following the followed node is analyzed to determine whether any of the one or more following nodes are interested in the type of subject matter. The social rank value assigned to the followed node for the type of subject matter is increased if it is determined that any of the one or more following nodes are interested in the type of subject matter. When it is determined that the search criteria is related to the type of subject matter (or the type of subject matter is determined based on the search criteria), for each of the search results in which at least one of the plurality of items of interest was identified, the node value for each node identified is based at least in part on the social rank value assigned to the node for the type of subject matter.

Alternatively, in addition to importance rating, the method may use a compatibility rating obtained for each of the plurality of nodes based on an analysis of similarity between social data associated with the user and social data associated with the node. In such embodiments, for each of the search results in which at least one of the plurality of items of interest was identified, the node value for each node identified is based at least in part on the compatibility rating associated with the node.

Alternatively, in addition to importance rating, the method may use a compatibility rating obtained for each of the plurality of nodes for a compatibility topic. In such embodiments, a compatibility rating is obtained for each node for the compatibility topic based on an analysis of similarity between social data associated with the user and social data associated with the node. The compatibility topic may be determined based on the search criteria. Alternatively, the compatibility topic may be determined based on social data associated with the user. If the compatibility topic is not determined based on the search criteria, a determination is made as to whether the search criteria is related to the compatibility topic. If it is determined that the search criteria is related to the compatibility topic (or the compatibility topic is determined based on the search criteria), for each of the search results in which at least one of the plurality of items of interest was identified, the node value for each node identified is based at least in part on the compatibility rating associated with the node and the compatibility topic.

Alternatively, in addition to importance ratings, and compatibility ratings obtained for each of the plurality of nodes for a compatibility topic, the method may use proximity ratings and social rank values. In such embodiments, the method may obtain the proximity ratings for the nodes, and social rank values for the followed nodes for a type of subject matter as described above. For each of the search results in which one of the plurality of items of interest was identified, the node value for each node identified is based at least in part on the proximity rating associated with the node. If it is determined that the search criteria is related to the compatibility topic (or the compatibility topic is determined based on the search criteria), the node value for each node identified is based at least in part on the compatibility rating associated with the node and the compatibility topic. If it is determined that the search criteria is related to the type of subject matter (or the type of subject matter is determined based on the search criteria), the node value for each node identified is based at least in part on the social rank value assigned to the node for the type of subject matter.

Another exemplary method uses a proximity rating determined for each of the plurality of nodes based at least in part on at least one of (1) a distance between the node and the user on the social graph, or (2) a physical distance between an entity represented by the node and the user. A sort value is determined for each of the search results in which at least one of the plurality of items of interest was identified. The sort value is determined for a particular search result by (1) identifying one or more nodes of the social graph associated with a voting value associated with any of the plurality of items of interest identified in the search result, (2) determining a node value for each node identified based at least in part on the proximity rating obtained for the node, and the voting value associated with both the node and any of the plurality of items of interest identified in the search result, and (3) determining the sort value for the search result based at least in part on the node value determined for each node identified. In addition to proximity ratings, an importance rating may be obtained for each of the plurality of nodes. In such embodiments, the proximity rating for each of the plurality of nodes is determined at least in part based on the importance rating of the node.

Another exemplary method identifies a plurality of compatibility topics and obtains a compatibility rating for each of the plurality of compatibility topics for each node based on similarity between social data associated with the user and social data associated with the node. One of the plurality of compatibility topics is identified as a search topic based on the search criteria. A sort value is determined for each of the search results in which at least one of the plurality of items of interest was identified. The sort value is determined for a particular search result by (1) identifying one or more nodes of the social graph associated with a voting value associated with any of the plurality of items of interest identified in the search result, (2) determining a node value for each node identified based at least in part on the compatibility rating associated with both the node and the search topic, and the voting value associated with both the node and any of the plurality of items of interest identified in the search result, and (3) determining the sort value for the search result based at least in part on the node value determined for each node identified.

Another exemplary method uses a social rank value obtained for each of the plurality of nodes. In such embodiments, a type of subject matter is identified. The type of subject matter may be determined based on the search criteria. Alternatively, the type of subject matter may be determined based on social data associated with the user. If the type of subject matter is not determined based on the search criteria, a determination is made as to whether the search criteria is related to the type of subject matter. Each of at least a portion of the plurality of nodes is identified as being a followed node. A followed node is a node that is followed by at least one other of the plurality of nodes in the social graph. One or more of the plurality of nodes that are following the followed node are identified. Each followed node has a social rank value assigned to the followed node for the type of subject matter. For each followed node, social data associated with the one or more of the nodes following the followed node is analyzed to determine whether any of the one or more following nodes are interested in the type of subject matter. The social rank value assigned to the followed node for the type of subject matter is increased if it is determined that any of the one or more following nodes are interested in the type of subject matter. When it is determined that the search criteria is related to the type of subject matter (or the type of subject matter is determined based on the search criteria), a sort value is determined for each of the search results in which at least one of the plurality of items of interest was identified. The sort value is determined for a particular search result by (1) identifying one or more nodes of the social graph associated with a voting value associated with any of the plurality of items of interest identified in the search result, (2) determining a node value for each node identified based at least in part on the social rank value associated with both the node and the type of subject matter, and the voting value associated with both the node and any of the plurality of items of interest identified in the search result, and (3) determining the sort value for the search result based at least in part on the node value determined for each node identified.

In embodiments using social rank values, the social rank value assigned to the followed node for the type of subject matter is increased when it is determined that any of the one or more following nodes are interested in the type of subject matter. The social rank value may be increased by identifying one or more of the interested following nodes which has assigned an importance rating to the followed node as rated nodes. Then, for each rated node, an increase amount may be calculated as a function of the importance rating assigned by the rated node to the followed node. Alternatively, for each rated node, an increase amount may be calculated as a function of the importance rating assigned by the rated node to the followed node, and the social rank value of the rated node. Then, the social rank value assigned to the followed node for the type of subject matter may be increased by the increase amount.

BRIEF DESCRIPTION OF THE SEVERAL VIEWS OF THE DRAWING(S)

FIG. 5A is a flow diagram of a method of using importance ratings to evaluate and display search results obtained from a web search.

FIG. 5B is a flow diagram of a method of using proximity ratings to evaluate and display search results obtained from a web search.

FIG. 8A is a flow diagram of a method of determining a compatibility rating with respect to a selected compatibility topic (e.g., restaurant preferences) for a node of the social graph of FIG. 1.

FIG. 8B is a flow diagram of a method of using the compatibility ratings determined by the method of FIG. 8A to evaluate and display search results returned by a web search.

DETAILED DESCRIPTION OF THE INVENTION

System Overview

Figure 2A:
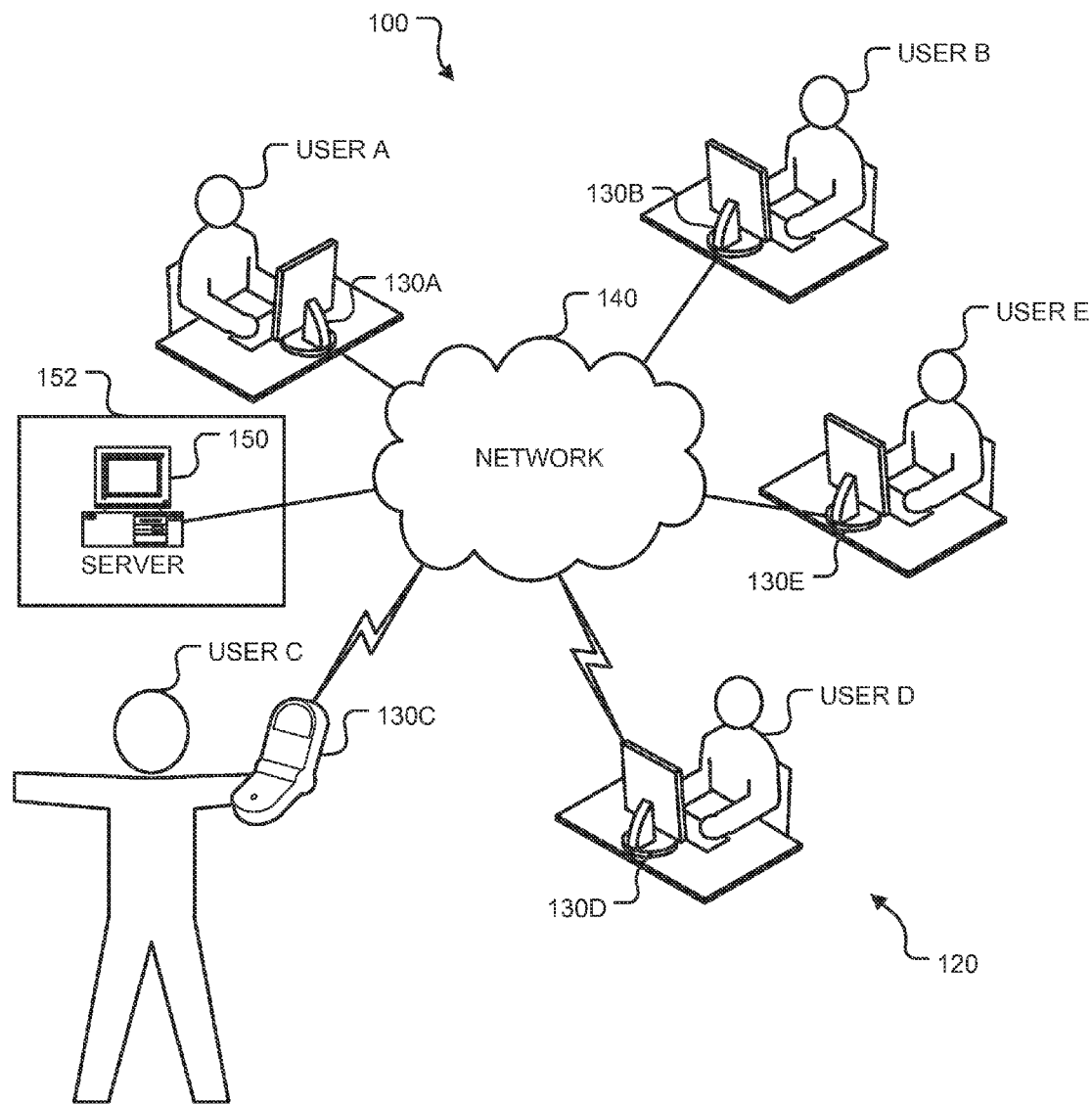
FIG. 2A is a diagram of a system configured to perform methods of FIGS. 3A, 3B, 4A, 4B, 4C, 4D, 4E, 5A, 5B, 8A, 8B, 9A, 9B, and 10, and to display a rating interface depicted in FIG. 6A, and an importance rating interface depicted in FIG. 6B.

Referring to FIG. 2A, embodiments will be described below with respect to a system 100 operated at least in part by a plurality of users 120. For illustrative purposes, the system 100 will be described with respect to the social graph 10 associated with the User A. Thus, by way of an illustrative and non-limiting example, the plurality of users 120 may include the Users A-J. However, only the Users A-E have been illustrated in FIG. 2A. Each of the plurality of users 120 operates at least one computing device. In the example illustrated, the Users A-E operate computing devices 130A-130E, respectively. In the system 100, the computing devices 130A-130E are connected to one another by a network 140.

Each of the plurality of users 120 may be an individual or other type of entity (e.g., a company, non-profit organization, institution, and the like). For example, one or more of the Users A-E may be a service provider, such as a news organization.

The system 100 includes at least one server 150 configured to provide at least one social networking service to the plurality of users 120 via the network 140 and the computing devices 130A-130E. A social networking service is an online service, platform, or site that focuses on facilitating the building of social networks or social relationships among people who, for example, share interests, activities, backgrounds, or real-life connections. A social network service generally includes a representation of each user (often referred as a user profile), an identification of social links between the user and other users, and a variety of additional services. Social networking services may be configured to allow users to share ideas, activities, events, photographs, and interests with other members to which they are linked. Many social network services are web-based and provide means for users to interact over the Internet (e.g., e-mail, status updates, instant messaging, and the like). Online community services may be considered to be social network services. The server 150 may be operated by a network service provider 152.

Many social networking services allow users to create user profiles. A user profile may include photographs, lists of personal interests, contact information, and other user information. Many social networking services provide communication services that enable users to communicate with other members (e.g., friends) through private messages, public messages, and/or chat features. Some social networking services also allow users to create and/or join interest groups. Some social networking services allow users to contact other users, share images and other media, play online games, post materials (e.g., messages), and/or tag themselves and/or other users. Examples of such social networking services include, Facebook operated by Facebook, Inc., Twitter (which is a real-time information network) operated by Twitter, Inc., and the like.

Figure 2B:
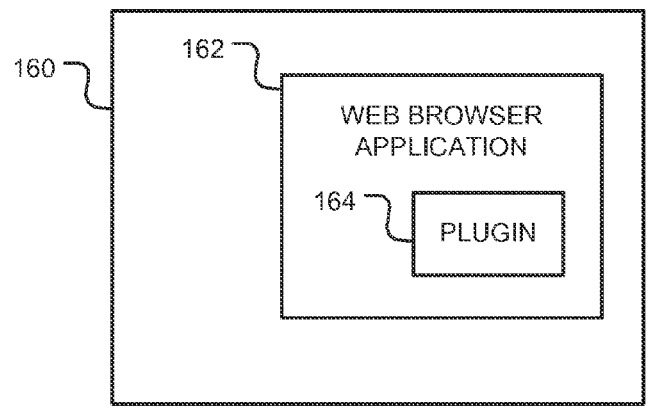
FIG. 2B is a block diagram illustrating components of a client application.

FIG. 2B is a block diagram of a client application 160 configured to execute on each of the computing devices 130A-130E. In the embodiment illustrated in FIG. 2A, a different instance of the client application 160 is executing on each of the computing devices 130A-130E. The client application 160 may be implemented as a single application or multiple applications.

The client application 160 may include a conventional web browser application 162 or may be implemented as a plugin 164 to a conventional web browser application. Alternatively, the client application 160 may include web pages displayed by the web browser application 162. Depending upon the implementation details, the client application 160 may be implemented wholly or in part as a web page, a website, a web application, a web browser plugin, a rich internet application ("RIA"), a mobile application, a desktop application, a stand-alone executable application, a feature within a website, a feature within a web page, or as a feature within a larger application.

Figure 2C:
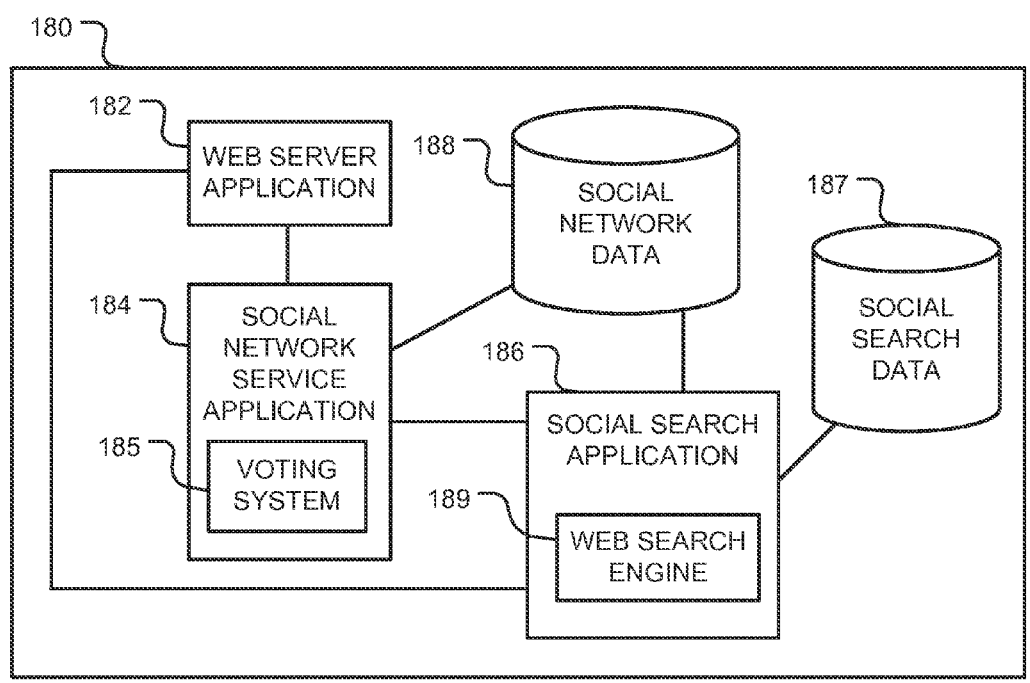
FIG. 2C is a block diagram illustrating components of a server application.

FIG. 2C is a block diagram of a server application 180 configured to execute on the server 150 (which may be implemented by one or more computing devices described below). The server application 180 may be implemented as a single application or multiple applications, which may be executing on the same computing device, or multiple computing devices. The server application 180 may include a conventional web server application 182 or may be separate from but communicate with a conventional web server application. The server application 180 may include a social network service application 184 and a social search application 186. The server application 180 may also include and/or store social network data 188. The social network data 188 may be used by the social network service application 184 and/or the social search application 186 to generate and/or store social graphs, user data, and the like for users of the social network service. The server application 180 may also include and/or store social search data 187. The social search data 187 may be used to store values, ratings, rankings, parameters, and the like used by the social search application 186.

The social network service application 184 is configured to provide at least one social networking service (e.g., status updates, messages, user profiles, and the like). The social network service application 184 may interact with the client application 160. For example, the social network service application 184 may instruct the client application 160 to display one or more user interfaces to the User A. The client application 160 may receive input from the User A and forward this user input to the social network service application 184. The social network service application 184 may include a voting system 185 configured to allow members of the social network to vote with respect to items of interest. Alternatively, the voting system 185 may be a separate application in communication with the social network service application 184.

The social search application 186 is configured to select and/or sort web search results based on social data. The social search application 186 may include a web search engine 189 or may communicate with an external web search engine (not shown). The external web search engine may be implemented on the server 150 or different computing device connected to the network 140. The social search application 186 may interact with the client application 160. For example, the social search application 186 may instruct the client application 160 to display one or more user interfaces to the User A. The client application 160 may receive input from the User A and forward this user input to the social search application 186.

Depending upon the implementation details the social network data 188 and/or the social search data 187 may be stored in one or more databases. However, this is not a requirement.

An exemplary hardware environment and an exemplary operating environment in which each of the computing devices 130A-130E and the server 150 of the system 100 may be implemented is described below with respect to FIG. 11.

The system 100 is configured to perform the methods described below. These methods leverage human intelligence and social data to evaluate web search results for the purposes of filtering and/or sorting the results for display to a user. Because these methods take advantage of information obtained from members of a social network, the results may be more accurate and difficult to manipulate (or cheat) when compared to approaches that do not use social data or human intelligence. Further, the results need not necessarily be personalized or tailored for a particular user, but may nevertheless be useful for all users.

A portion of the methods described below use importance ratings, proximity ratings, compatibility ratings, and/or social rank values to select and/or sort web search results.

Terminology

Unless otherwise stated, the term "social network" or "social networking service" refers to one or more network services provided by the network service provider 152. The social network service application 184 is configured to provide such services. Subscribers and/or users of a social networking service are referred to as members of the social network. Exemplary services that may be provided by the network service provider 152 include (1) the ability to "follow" (defined below) another member, (2) the ability to post status updates that are sent to other members of the social network, (3) the ability for members to enter votes (e.g., indicate they "Like") items of interest, (4) the ability to accept friend requests from and send friend requests to other members, (5) the ability to generate and/or modify "social data" (defined below), (6) the ability for members to log into the social networking service, (7) the ability to display to a particular member (who has logged into the social networking service) a homepage and/or dashboard that displays status updates related to other members, and the like. As mentioned above, the social network service application 184 may store data in the social network data 188 that may be used to generate a social graph associated with a particular user. Nodes of the social graph represent members of the social network. Each user may be characterized as having a different social graph even if one or more of the social graphs are connected to one another. Depending upon the implementation details, members of the social network associated with a particular user may include "friends" of the particular user, users the particular user is "following" (defined below), users that are "following" the particular user, and the like.

Unless otherwise stated, "social data" refers to data generated by the members of a "social network" (defined above), the social networking service, and/or the network service provider 152 that is shared with a particular user (e.g., the User A). Non-limiting examples of "social data" include status updates, messages, votes, settings, preferences, photos, images, videos, bookmarks, links, discussions, broadcasts, files, folders, emails, and all other data created on, modified on, and/or used by the "social network" and/or the network service provider 152. This "social data" may be created by members of the social graph of the particular user, which may include, without limitation, the particular user, "friends" of the particular user, "followers" of the particular user, users that the particular user is following, and any member of the "social network" or social networking service provided by the network service provider 152. "Social data" may also be created by any user of software depending on the social network, the social networking service, and/or the network service provider 152 (which may include developers, machines, algorithms, software, code, functions, applications, etc.). "Social data" may also include metadata (such as names, dates and times, location(s), and the like) associated with any of the above examples of "social data." "Social data" may also include one or more engagement metric (defined below).

The term engagement metric refers to a metric that measures how much a user (e.g., the User A) interacts with another member (e.g., User B or User C) on a social network. An engagement metric may be determined based on a quantity of messages sent, profile views, etc.

The term "friend" refers to a pair of members that are following (defined below) each other. Thus, a mutual (two-way) connection exists between members that are friends.

The term "follow" is evident to those of ordinary skill in the art and loosely defines a one-way relationship where one member receives (and/or has access to) "social data" generated by or about another member. The relationship may be two-way/mutual if both members are "following" each other. Thus, a "friend" (e.g., the User B) of the User A is both following and followed by the User A.

The term "status updates" refers to broadcasts sent by (or messages that are broadcasted by) a sending member to one or more receiving members of a social network. Thus, referring to the social graph 10, status updates may be sent between the Users A-I. Further, status updates created by the User C may be sent to the User J (who is "following" the User C). Status updates may include news related to the sending member's life, news in general, the sending member's thoughts and/or opinions, general thoughts and/or opinions, comments, information about or identifications of items of interest, etc. "Status updates" may include re-broadcasts of the sending member's original status update(s), and/or re-broadcasts of another member's original status update(s).

Methods of Organizing Social Data

In the following example, for illustrative purposes, the User A receives status updates from the other users that the User A is "following." However, as explained above, when "following" another user, the User A may receive other types of "social data" from the users being "followed."

As mentioned above, in the social graph 10 illustrated in FIG. 1, the User A is following the User B who is also "following" the User A. However, the User B is not required to reciprocate and follow the User A. For example, the User A is following each of the Users C-E, who are not following the User A. "Following" may be useful if, for example, the User E is a content provider (e.g., a news outlet, website, or organization) and the User A has interest in the content (e.g., news) provided by the User C.

Unfortunately, prior art methods of "following" users can become chaotic. For example, if the "followed" user (e.g., the User E) posts news in a variety of categories (such as politics, technology, and sports), the "following" user (e.g., the User A) will receive status updates regarding these postings regardless of whether the "following" user (e.g., the User A) is interested in such postings.

Figure 3A:
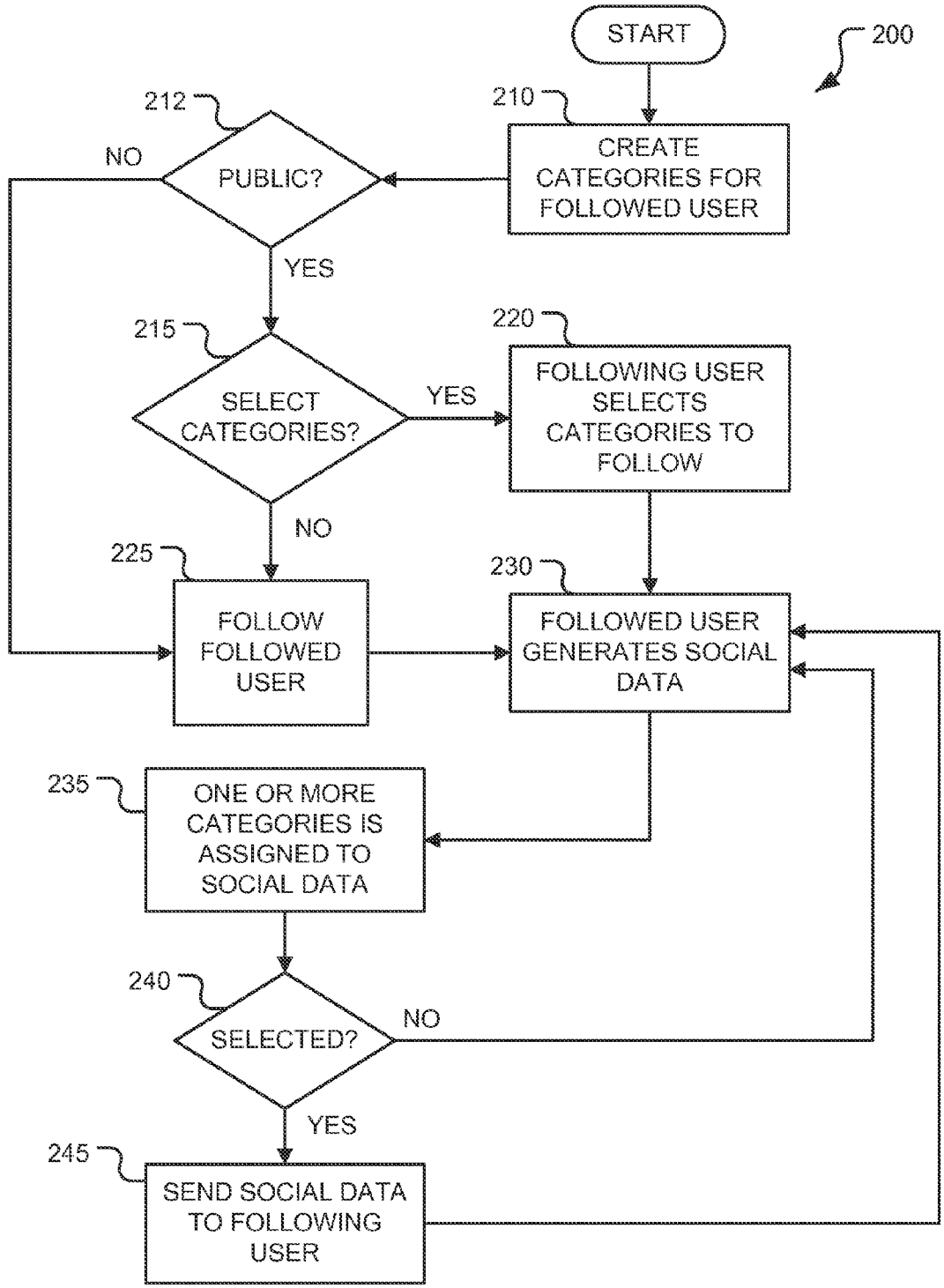
FIG. 3A is a flow diagram of a method of creating categories for a followed user and assigning those categories to social data created by the followed user.

FIG. 3A is a flow diagram of a method 200 that may be used to avoid this result. In first block 210, categories are created for "social data" generated by the "followed" user (e.g., the User E). The categories may be created manually by the "followed" user, automatically by the client application 160, and/or automatically by the server application 180. If the categories are created manually, categories created by the "followed" user may be entered into the computing device (e.g., the computing device 130E) operated by the followed user (e.g., the User E) using a user interface (e.g., user interface described below with respect to a computing device 12 illustrated in FIG. 11). The categories may be stored locally by the client application 160 or remotely by the server application 180. Thus, in block 210, the server application 180 may receive the categories from the client application 160.

As mentioned above, the "social data" may include status updates, message, discussions, photos, images, videos, data, broadcasts, and/or other types of "social data." The categories may be designated as public or private.

In decision block 212, the server application 180 determines whether the categories created in block 210 are public. The decision in decision block 212 is "YES" when the categories created in block 210 are public. The decision in decision block 212 is "NO" when the categories created in block 210 are private. If the decision in decision block 212 is "YES," the server application 180 advances to decision block 215. If the decision in decision block 212 is "NO," the server application 180 advances to block 225.

In decision block 215, the "following" user decides whether to follow categories created for the "followed" user. The decision in decision block 215 is "YES" when the "following" user decides to follow categories created for the "followed" user. The decision in decision block 215 is "NO" when the "following" user decides not to follow categories created for the "followed" user. If the decision in decision block 215 is "YES," the method 200 advances to block 220. If the decision in decision block 215 is "NO," the method 200 advances to block 225.

In decision block 215, the server application 180 may direct the client application 160 to display the categories created in block 210 to the "following" user via a display device (e.g., a monitor 47 described below with respect to FIG. 11). The "following" user may indicate whether the "following" user would like to select one or more categories to "follow" using the user interface. The client application 160 may forward this indication to the server application 180.

In block 220, the "following" user selects one or more specific categories (such as "technology," "sports," and the like) to "follow."

In block 225, the "following" user indicates the "following" user wishes to "follow" the "followed" user without selecting one or more specific categories and receive all status updates (e.g., news) regardless of their category.

In block 230, the "followed" user generates "social data."

In block 235, one or more categories is assigned to the "social data" generated in block 230. The one or more categories may be assigned manually by the "followed" user, automatically by the client application 160, and/or automatically by the server application 180. If the categories are assigned manually, categories assigned by the "followed" user may be selected using the computing device (e.g., the computing device 130E) operated by the followed user (e.g., the User E) via the user interface (e.g., the user interface described below with respect the computing device 12 illustrated in FIG. 11). The assignment may be stored locally by the client application 160 or remotely by the server application 180. Thus, in block 210, the server application 180 may receive the assignment from the client application 160.

In decision block 240, the server application 180 determines whether the one or more categories assigned to the "social data" in block 235 were selected by the "following" user in the block 220. The decision in decision block 240 is "YES" when one of the categories assigned to the "social data" in block 235 was selected by the "following" user in the block 220 or the "following" user is following the "followed" user (i.e., block 225 was performed). On the other hand, the decision in decision block 240 is "NO" when none of the categories assigned to the "social data" in block 235 were selected by the "following" user in the block 220 and the "following" user is not following the "followed" user (i.e., block 225 was not performed). When the decision in decision block 240 is "YES," the server application 180 advances to block 245. When the decision in decision block 240 is "NO," the server application 180 returns to block 230 and waits for the "followed" user to create more "social data."

In block 245, the server application 180 sends "social data" to the client application 160 executing on the computing device (e.g., the computing device 130A) operated by the "following" user (e.g., the User A). Then, the server application 180 returns to block 230 and waits for the "followed" user to create more "social data."

Figure 3B:
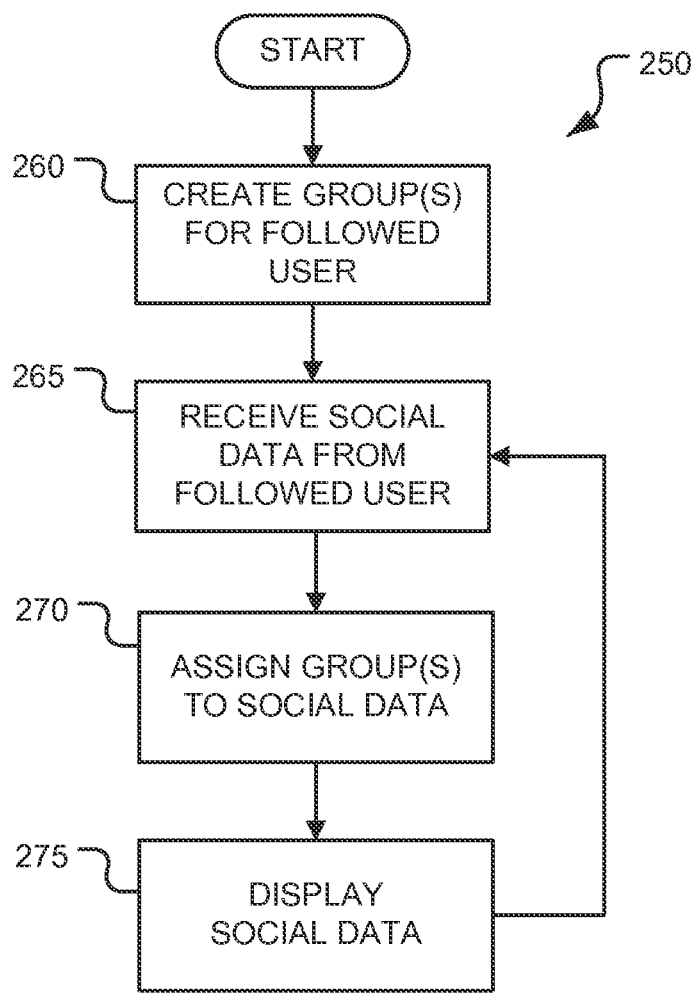
FIG. 3B is a flow diagram of a method of creating groups for a following user, assigning social data received from a followed user to those groups, and displaying the social data.

FIG. 3B is a flow diagram of a method 250 that may also be used to avoid chaos. The method 250 may be used with the method 200 or separately. The method 250 allows the "following" user (e.g., the User A) to create one or more groups into which to sort and/or store the "social data" received from those users that the "following" user is following. For ease of illustration, the method 250 will be described with respect to a single "followed" user. However, as is apparent to those of ordinary skill in the art, the "following" user may follow multiple users and such embodiments are within the scope of the present description.

In first block 260, groups are created for "social data" received by the "following" user (e.g., the User A) from particular users. The groups may be created manually by the "following" user, automatically by the client application 160, and/or automatically by the server application 180. If the groups are created manually, groups created by the "following" user may be entered into the computing device (e.g., the computing device 130E) operated by the "following" user (e.g., the User A) using a user interface (e.g., the user interface described below with respect the computing device 12 illustrated in FIG. 11). The groups may be stored locally by the client application 160 or remotely by the server application 180. Thus, in block 260, the server application 180 may receive the groups from the client application 160.

For example, in block 260, the "following" user (e.g., the User A) can assign a group to a selected "followed" user (e.g., the User E). Further, the "following" user can assign specific categories the "following" user is following from the "followed" user to one or more groups. The group(s) may be used to distinguish or categorize data sent or broadcasted by other users that the "following" user is following or with whom the "following" user is a friend.

For example, the User A may have created the following user-defined groups:
1. Everyone Group;
2. Technology News Group;
3. Sports News Group; and
4. Psychology News Group.

In this example, the User C provides only psychology news and discussions and the User B may provide news related to politics, health, technology, sports, and psychology. The User D may be a friend of the User A from college who does not provide any news.

In block 260, the User A (who is "following" the User C) may assign the User C to the Psychology News Group. If the User B has a "technology" category, the User A may choose to "follow" the User B's "technology" category and assign "social data" categorized as belonging to this category to the Technology News Group defined by the User A. Likewise, if the User B has a "sports" category, the User A may choose to "follow" the User B's "sports" category and assign "social data" categorized as belonging to this category to the Sports News Group defined by the User A. Further, if the User B has a "psychology" category, the User A may choose to "follow" the User B's "psychology" category and assign "social data" categorized as belonging to this category to the Psychology News Group defined by the User A.

User A may then "follow" or add the User D as a "friend" (e.g., via a mutual link) and simply assign the User D to the "Everyone" group.

All of the above actions can be performed manually by the User A. Alternatively, these actions may be performed automatically via an algorithm, software, application, program, data, plugin, function, or code.

The "Everyone" group may be automatically assigned to anyone that the User A is "following" or has added as a friend, which includes without limitation the Users B-E.

To summarize the above example, the groups created by User A may be associated with the Users B-D as depicted in Table 1-A below.

TABLE 1-A

| Everyone | Technology News | Sports News | Psychology News |
| --- | --- | --- | --- |
| User B | User B | User B | User B |
| User C | | | User C |
| User D | | | |

If the User B created the categories described above and the User A assigned the categories to groups as also described above, the groups created by User A will be receiving the data categorized by the User B as depicted in Table 1-B below.

TABLE 1-B

| Everyone | Technology News | Sports News | Psychology News |
| --- | --- | --- | --- |
| User B | Social data associated with User B and categorized as belonging to the technology category | Social data associated with User B and categorized as belonging to the sports category | Social data associated with User B and categorized as belonging to the psychology category |
| User C | | | User C |
| User D | | | |

If the categories created by the "followed" user are private, the server application 180 may automatically match the categories with the groups created by the "following" user. For example, the server application 180 may automatically match a "sports news" category associated with the "followed" user with a "sports" group associated with the "following" user.

In block 265, "social data" is received from the "followed" user. For example, the "social data" received may have been sent in block 245 of the method 200.

In block 270, the "social data" received in block 265 is assigned to one or more groups created in block 260 for the "followed" user who created the "social data."

In block 275, the "social data" is displayed to the "following" user. The "social data" may be displayed after the "following" user selects a group to display.

Importance Rating

Figure 1:
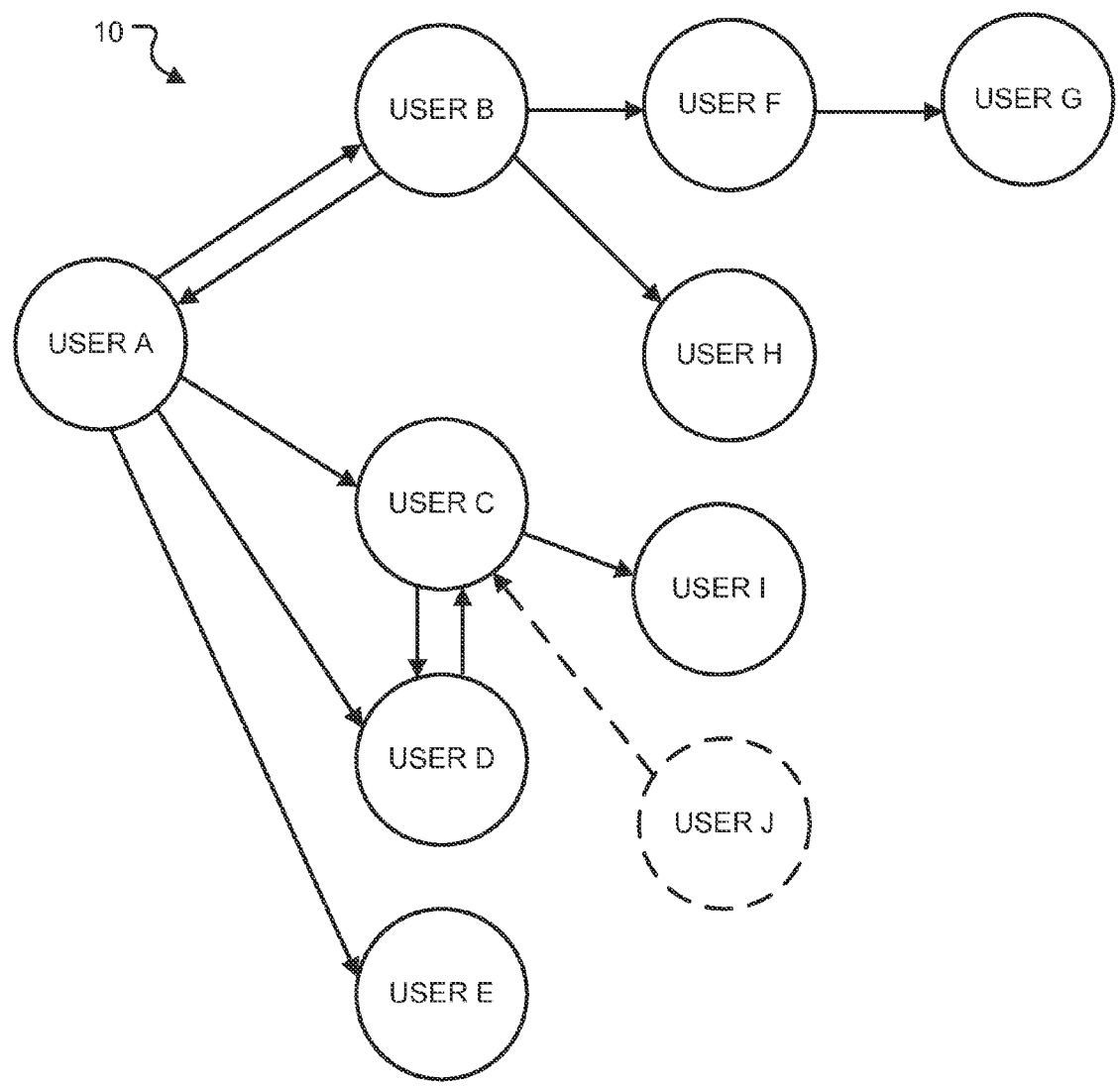
FIG. 1 is an illustration of exemplary social graph associated with a User A that includes nodes representing Users A-I and is connected to a node representing User J.

In social networking, users are often bombarded with meaningless data and may miss important events, status updates, or messages from people that matter most to those users. For the purposes of illustration, when discussing this embodiment, as illustrated in FIG. 1, the User A is following the Users B-E. However, the relationships between the User A and the Users B-E are different. The User B is a university friend of the User A. The User C is a colleague of the User A. The User D is a best friend of the User A. The relationship between the User A and the User E will be discussed below.

Further, in this example, information from and about the Users B-D differs in importance to the User A. The User A ranks information related to the User D as more important than information related to the Users B and C. Thus, the User D's status updates, messages, and all other data about the User D's social life are far more important to the User A than that of any of the other users. The User A ranks information related to the User B as more important than information related to the User C. The User A considers information related to the User C to be least important. For example, information related to the User C (e.g., information about his/her social life) may be of little to no significance to the User A. Thus, the Users B-D may be characterized as being ranked by the User A as follows from most important to least important:

1. User D (most important);
2. User B; and
3. User C (least important).

With current technologies and software available, when the User A logs into a social networking service, the User A's dashboard/homepage will show a list of status updates for the Users B-D. Table 2-A below provides an example of the types of updates that might be displayed to the User A:

TABLE 2-A

| User | Status Update |
| --- | --- |
| User C | Just got in the car. |
| User C | Wow, I really can believe it's not butter! |
| User C | I'm hungry. |
| User C | What's a good TV show to watch? |
| User C | Almost forgot it was a weekend! |
| User B | Just got my master's degree! |
| User C | I hate making breakfast. |
| User C | I'm bored. |
| User D | I just got married! |
| User C | Just woke up. |

As shown above in Table 2-A, current technologies do not rank such updates by importance to the User A.

For convenience, to help distinguish these status updates based on importance, the text in the leftmost column identifying the user (e.g., User B, User C, or User D) may be color-coded. For example, red text may be used to identify a least important user or users. Thus, User C may be displayed using red text. Green text may be used to identify a most important user or users. Thus, User D may be displayed using green text. Yellow text may be used to identify those users falling in between the least and most important users. Thus, User B may be displayed using yellow text. However, the use of color-coded text (or some other visual indicator) is not required to indicate importance.

The system 100 may be configured such that the User A may provide importance information with respect to other members of the social network. Such importance information may include an importance value and/or an importance rank. For ease of illustration, importance value and importance rank will be referred to collectively as "importance rating." The term "importance rating" may refer to importance value alone, importance rank alone, a combination of importance value and importance rank, or both importance value and importance rank together but maintained as separate values.

Figure 4A:
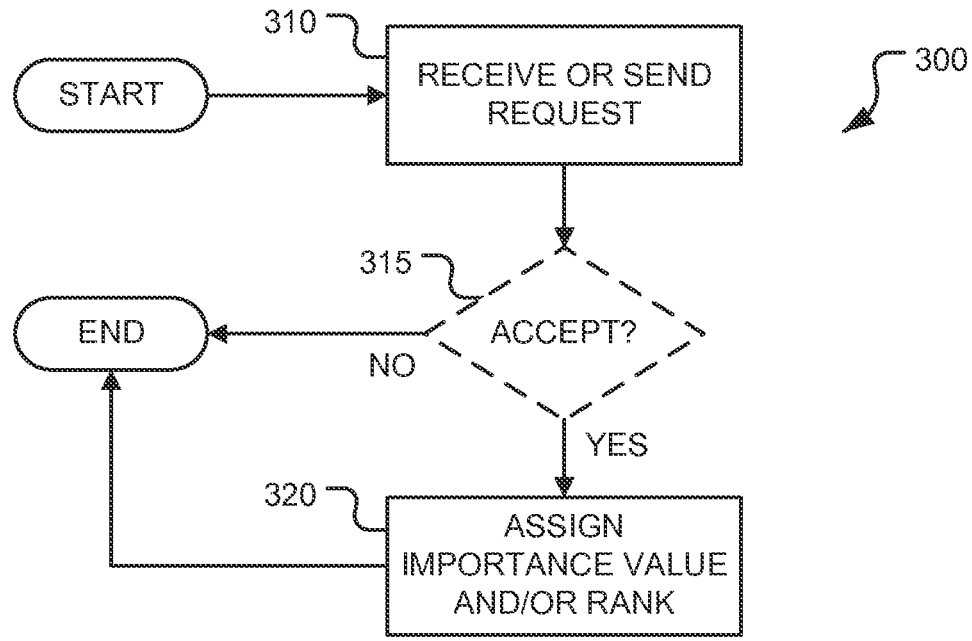
FIG. 4A is a flow diagram of a method of assigning an importance value and/or an importance rank to a first user who has received or sent a "friend" or "follower" request to a second user.

FIG. 4A is a flow diagram of a method of indicating importance of other users (e.g., the Users B-E) to a particular user (e.g., the User A). In first block 310, the user receives a request from or sends a request to another user. The request may request that the recipient become a "friend" of the sender. Alternatively, the request may request that the sender become a "follower" of the recipient.

For ease of illustration, the user receiving the request will be described as being the User A and the user who sent the request will be described as being the User B. Further, the request will be an invitation sent by the User B inviting the User A to become the User B's friend. Further, for illustrative purposes only, the method 300 will be described with respect to determining the importance of other members of the social network to the User A.

As is apparent to those of ordinary skill in the art, the request is initiated by the client application 160 operated by the sender (e.g., the User B) and forwarded to the server application 180. The server application 180 forwards the request to the client application 160 operated by the recipient (e.g., the User A), which displays the request to the recipient.

In optional decision block 315, the system 100 receives the recipient's decision regarding whether the recipient has accepted the request. The decision received in optional decision block 315 is "YES" when the recipient has decided to accept the request. On the other hand, the decision received in optional decision block 315 is "NO" when the recipient has decided to reject the request. In optional decision block 315, the client application 160 operated by the recipient (e.g., the User A) receives an indication from the recipient (via a user interface) indicating whether the recipient wishes to accept or reject the request.

When the decision in decision block 315 is "YES," and the recipient is the User A, the client application 160 operated by the User A may advance to block 320. When the decision in decision block 315 is "YES," and the sender is the User A, the client application 160 operated by the recipient may forward the recipient's decision to the server application 180 and then may advance to block 320. When the decision in decision block 315 is "NO," the method 300 terminates.

In embodiments in which the optional decision block 315 is omitted, after block 310, block 320 is performed.

In block 320, the client application 160 operated by the User A generates a display asking the User A to input an importance rating (e.g., an importance value, and/or importance rank). If the User A was the recipient of the request in block 310, in block 320, the client application 160 operated by the User A generates a display asking the User A to input an importance rating for the sender (e.g., the User B) of the request. On the other hand, if the User A was the sender of the request in block 310, in block 320, the server application 180 may instruct the client application 160 operated by the User A to generate a display asking the User A to input an importance rating for the recipient of the request. Thus, the client application 160 may generate this display in response to instructions received from the server application 180. Further, the client application 160 may generate this display without instructions from the server application 180 to do so.

In block 320, the client application 160 operated by the User A receives an importance rating from the User A. For example, referring to FIG. 6B the User A may enter the importance rating via a user interface 530 displayed by the computing device 130A. Next, the client application 160 forwards the importance rating to the server application 180. The server application 180 may store the importance rating in the social search data 187 (which may reside in a database), and/or the social network data 188 (which may reside in a database). Then, the method 300 terminates.

By way of a non-limiting example, as mentioned above, the importance rating may include an importance value. The importance value may be a numerical value. In block 320, the User A may be asked to assign an importance value to the User B on a scale, e.g., ranging from 0 to 10, with 0 being the least important and 10 being the most important. For example, the User A may enter the importance value in an input box 560 of the importance rating interface 530. In FIG. 6B, the User D has been selected and an importance value of 10 has been entered in the input box 560. However, the range of the scale is not restricted to from 0 to 10. Any range may be used. Further, the importance value need not be numeric. Alternatively, the importance value may be an image-based value, a graph-based value, a text-based value (e.g., "no importance," "somewhat important," "very important," and the like), an abstract value, etc. For example, in some embodiments, the importance value may be based on a selection of "positive" versus "negative," "Like" versus "Dislike," and the like. Other selection options may include "positive," "neutral," or "negative."

Thus, using the method 300 whenever the User A and any other user(s) become "friends" on the social network by way of the User A accepting a "friend" request from another user, the User A is asked to rank the new friend's "importance" to User A. If desired, the User A may change the importance value assigned to a particular user at any time later (e.g., using the importance rating interface 530 illustrated in FIG. 6B). Furthermore, if the User A is the user initiating the friend request, the User A may be asked (e.g., by the server application 180 via the client application 160) to provide an importance value for the user to whom the request is being sent by the User A. In some embodiments, the client application 160 may ask the User A to provide an importance value for the user to whom the request is being sent without having received an instruction from the server application 180 to do so.

For example, when User B, User C, and User D become "friends" with User A on the social network, the User A may assign importance values to the Users B-D. By way of a non-limiting example, as shown in Table 2-B below, the Users B-D may be assigned importance values 9, 1, and 10, respectively:

TABLE 2-B

| User | Importance (Scale: 0-10) |
|------|--------------------------|
| User B | 9 |
| User C | 1 |
| User D | 10 |

Alternatively, in block 320, the User A may assign an importance rank to each of the User A's friends that ranks them in order of importance with or without using an importance value. For example, the User A's friends may be presented in a sortable and/or rankable list 540 that can be used with or without importance values. This may be used to provide additional flexibility when there are multiple friends having the same importance value. For example, if the User E was also assigned an importance value equal to 10, there are two users with an importance value equal to 10: User D, and User E. However, the User A considers the User D to be more important than the User E. Thus, the User A may rank Users B-E as follows:
 1. User D (importance value=10);
 2. User E (importance value=10);
 3. User B (importance value=9); and
 4. User C (importance value=1).

As evident above, users may be ranked (using importance rank) according to importance (or priority) without using a numeric scale so that the User D is more important than User E. In contrast, when scales are used, it may not have been possible to distinguish this difference because Users D and E were both assigned importance values equal to 10.

Further, depending upon the implementation details, in block 320, a combination of importance rank (e.g., a "priority list") and importance values may be used. Using this approach, the importance rank and importance values listed in Table 2-C may be assigned to the Users B-E.

TABLE 2-C

| User   | Importance Rank | Importance Value (Scale: 0-10) |
|--------|-----------------|--------------------------------|
| User D | 1               | 10                             |
| User E | 2               | 10                             |
| User B | 3               | 9                              |
| User C | 4               | 1                              |

Using the importance rating interface 530, the importance rank and/or importance values of members of the User A's social graph 10 may be determined manually by the User A. The importance rating interface 530 may also be used to update or modify importance ratings independently of whether a request has been received or sent.

Alternatively, the importance rank and/or importance value may be determined automatically (e.g., via an algorithm, software, application, program, data, plugin, function, or code) based on, but not limited to one or more of the following:

Patterns in User A's actions (e.g., identified using pattern recognition). For example, if the User A always marks status updates received from the User B's as "spam," the server application 180 may determine the User A does not consider the User B's status updates to be important and may automatically assign the User B a low importance value and/or a low importance rank.

Analysis of the text or data included in the User A's "social data" or the social data of the social network associated with the User A.

Appearance and number of times of appearance of the user in the User A's "social data," images, photos, videos, links, or other data.

Appearance and number of times of appearance of the user in the "social data," images, photos, videos, links, or other data of the social network associated with the User A.

Optionally, any node in the social graph 10 (see FIG. 1) that has not been assigned an importance rating using any of the methods described above may be assigned an initial or default value (e.g., an importance value=0). Further, any such nodes may be assigned the lowest importance ranks.

Figure 4B:
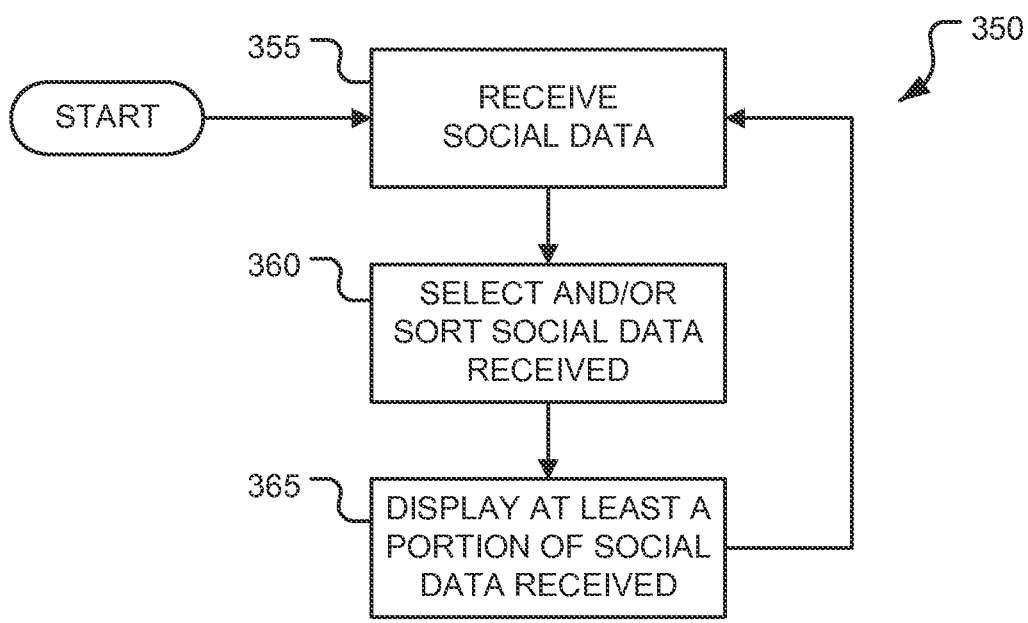
FIG. 4B is a flow diagram of a method of using importance value and/or importance rank to select and/or sort social data received from other users for display.

FIG. 4B is a flow diagram of a method 350 of selecting and displaying social data to a user (e.g., the User A).

In block 355, the server application 180 receives or fetches "social data" from other members (e.g., the Users B-D) of the social network. For example, the "social data" received may have been sent in block 245 of the method 200. By way of another non-limiting example, the "social data" received may have been fetched from a database storing the social network data 188. The server application 180 may forward the "social data" to the client application 160 operated by the User A.

In block 360, the server application 180 and/or the client application 160 operated by the User A uses the importance ratings assigned to the users from whom "social data" is received in block 355 to select and/or sort the "social data" for display to the User A. In block 360, the "social data" received by the server application 180 may be forwarded to the client application 160 for selection and/or sorting thereby. By way of another non-limiting example, the server application 180 may perform the selection and/or sorting and forward the results thereof to the client application 160.

Based on the importance rating (e.g., the importance value and/or importance rank) of each of the users from whom "social data" is received, the User A's "social data" may be sorted in block 360. The "social data" can be sorted or further sorted based on data other than or in addition to the importance ratings. For example, the "social data" may be selected and/or sorted based on other data or metadata such as dates and times the "social data" was posted or uploaded. Other types of sorting, such as alphanumeric sorting, ascending sorting, descending sorting, and other sorting algorithms or categories, may be used with or in addition to sorting based on importance rating.

By way of an example, using the importance ratings assigned to the Users B-D by the User A provided in Table 2-C, the status updates in Table 2-A (above) may be re-sorted with those received from more important users appearing above those received from less important users as shown in Table 2-D below:

TABLE 2-D

| User   | Status Update                              |
|--------|--------------------------------------------|
| User D | I just got married!                        |
| User B | Just got my master's degree!               |
| User C | Just got in the car.                       |
| User C | Wow, I really can believe it's not butter! |
| User C | I'm hungry.                                |
| User C | What's a good TV show to watch?            |
| User C | Almost forgot it was a weekend!            |
| User C | I hate making breakfast.                   |
| User C | I'm bored.                                 |
| User C | Just woke up.                              |

Furthermore, if the User C and the User C's social life are of no significance to the User A, the User A may assign an importance value to the User C indicating this complete lack of importance (e.g., an importance value=0). Such an importance value may "mute" the User C's status updates, and the User A's homepage/dashboard may now look as follows in Table 2-E:

TABLE 2-E

| User   | Status Update                |
|--------|------------------------------|
| User D | I just got married!          |
| User B | Just got my master's degree! |

In block 365, the client application 160 displays the "social data" selected in block 360 and/or sorted in block 360 to the User A via the computing device 130A. For example, the Table 2-D or the Table 2-E may be displayed to the User A.

Then, the method 350 terminates.

In some embodiments, in addition to being able to assign importance values and/or importance ranks to users, the server application 180 is configured to allow a particular user (e.g., the User A) to assign importance values and/or importance ranks to the categories created in the method 200 illustrated in FIG. 3A. Further, in some embodiments, the server application 180 is configured to allow a particular user (e.g., the User A) to assign importance values and/or importance ranks to the groups created in the method 250 illustrated in FIG. 3B. For example, as discussed with respect to the methods 200 and 250 above, a user may wish to receive "social data" belonging to only selected categories from particular users. For example, the User A may be following the User E (which is an online business publication in this example), for User E's business news, but finds the quality of User E's technology news really suffers. Nevertheless, the User A may want to receive both the business news and technology news from the User E, and using the method 200 (see FIG. 3A) the User A may choose to receive "social data" from the User E in only these categories. However, the User A may prefer an online technology journal's technology news over the technology news provided by the User E. The method 300 (see FIG. 4A) allows the User A to assign an importance rating to the online technology journal that indicates a greater importance than the importance of the User E in User A's Technology News Group.

Importance ratings may further be applied outside of a social networking context. For example, importance value and/or importance rank may be used to select and/or sort email, messaging, instant messaging, text messaging, video messaging, video conferencing, voice messaging, voicemail, voice chat, phone calls, telecommunications, and all forms of communications and/or online social interactions.

Thus, the methods described above may be used to cut through spam, clutter, meaningless messages, and other "social data" posted by the members of the social network associated with the User A.

While the User A may have relationships with the members (e.g., the Users B-E) of the social network associated with the User A, this is not always necessarily the case. "Importance" to the User A may not necessarily reflect the strength of a relationship with one or more of the members (e.g., the Users B-E) of the social network associated with the User A. For example, the User A may "follow" the User B because the User B provides news of interest to the User A. However, the User B may not necessarily personally know or may have never met the User A. This is especially the case with news organizations, celebrities, and the like. Nevertheless, the importance rating assigned to a friend or contact (e.g., one or more of the Users B-E) may be used as a basis for rating or ranking search results.

FIG. 5A is a flow diagram of a method 400 of using importance ratings to evaluate and display search results obtained from a web search. In first block 410, the client application 160 receives search criteria (e.g., one or more search terms) from the user. For ease of illustration, in this example, the User A will be described as conducting the search. Further, the User A will be described as conducting a search for a restaurant in a particular city (e.g., Seattle). Thus, exemplary search criteria received by the client application 160 may include the search terms such as "restaurant" and "Seattle."

In block 415, the server application 180 obtains search results using the search criteria received in block 410. Thus, in block 415, the client application 160 forwards the search criteria to the server application 180 and the server application conducts a web search using the search criteria. The web search may be conducted by the web search engine 189 of the social search application 186 of the server application 180. Alternatively, the web search may be conducted by a search engine (e.g., a search engine operated by Google, Yahoo, and the like) that returns the search results to the server application 180. In the example where the User A is searching for a restaurant in Seattle, the search results may identify three restaurants: Restaurant A, Restaurant B, and Restaurant C.

In block 420, the server application 180 evaluates the search results obtained in block 415 based on the importance rating assigned to the members of the user's social network. The evaluation process may assign points to each of the search results that may be used to filter and/or sort the search results. Continuing the above example, the User B has "voted up" the Restaurant A and the User C has "voted up" the Restaurant C. In this example, the Users B and C were assigned importance values 10 and 1, respectively. Since the User B was assigned an importance value equal to 10, the User B's rating will be given more weight than the User C's rating (who has an importance value equal to 1). Therefore, ignoring Restaurant B for the moment, in block 420, the search results may be ranked or ordered based on the importance ratings assigned to the Users B and C as follows:

1. Restaurant A; and
2. Restaurant C.

Figure 6A:
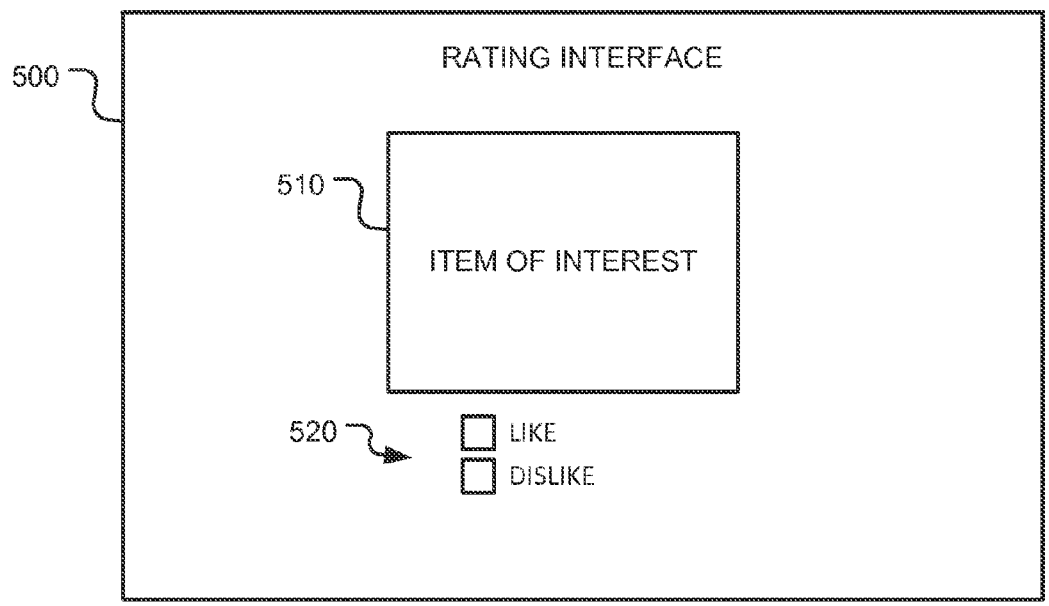
FIG. 6A is an illustration of a rating interface used to rate (or vote with respect to) an item of interest.
Figure 6B:
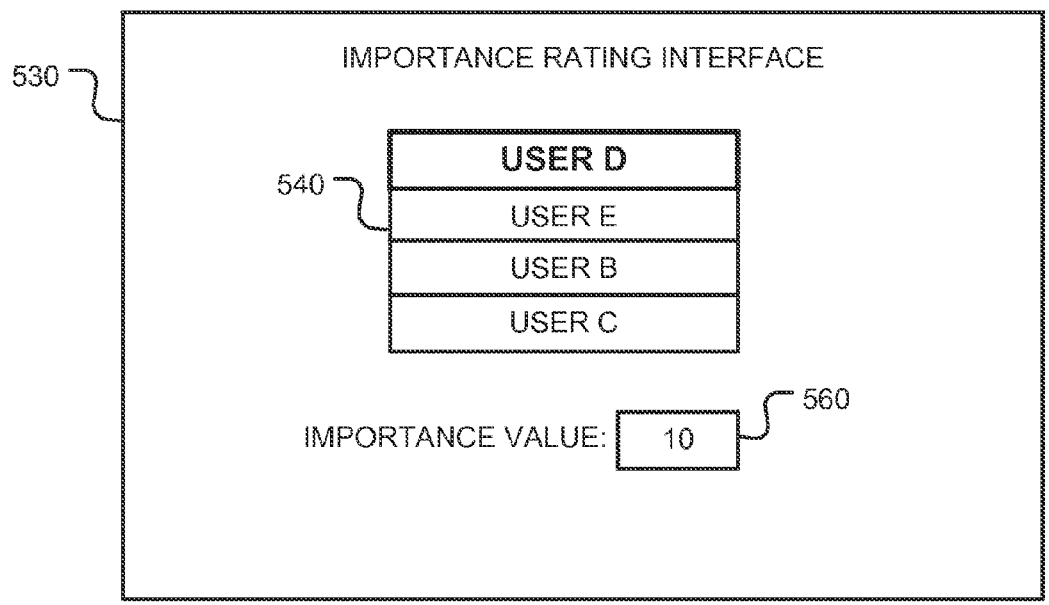
FIG. 6B is an illustration of an importance rating interface.

Referring to FIG. 6A, the ratings (e.g., "voting up") used in block 420 may have been obtained via a rating interface 500. The server application 180 executing on the server 150 (see FIG. 1) may be configured to generate the rating interface 500 to be displayed by the client application 160 executing on the computing devices 130A-130E. By way of a non-limiting example, the social network service application 184 may be configured to generate the rating interface 500 and store rating information received in the social network data 188. The rating interface 500 allows users (e.g., the Users B and C) to rate an item of interest 510 (e.g., website, restaurant, place, organization, file, data, etc.). For example, the rating interface 500 may be constructed using a simple "Like/Dislike" interface 520 or a more complex rating system that allows users to rate (e.g., 1-5 stars) an item of interest (e.g., a restaurant) in one or more categories (e.g. Customer Service, Quality of Food, etc.). By way of another non-limiting example, the rating interface 500 may be constructed using a simple rating system with only a button reflecting a positive sentiment (and omitting a button reflecting a negative sentiment).

The rating interface 500 is configured to receive input from users (e.g., votes) and may be part of the voting system 185 (see FIG. 2C). In some embodiments, the voting system 185 generates the rating interface 500, receives user input (rating information) therefrom, and stores the rating information received in the social search data 187 and/or the social network data 188. The rating interface 500 may be embedded on a web page or website for easy access to the voting mechanism (and optionally may allow for entering comments, sharing files, and sharing data) so the user does not always have to login. The voting system 185 is not restricted to websites but can be used for directory listings, user profiles, files, data, social data, bookmarks, emails, messages, news, and more.

If the rating interface 500 includes the "Like/Dislike" interface 520 (or system), the server application 180 may assign a point value to each search result. Point values may be determined based on how important the user who "Liked" or "Disliked" a search result is to the User A. For example, referring to FIG. 7, if the User B "Likes" the Restaurant A, the server application 180 may assign 10 points to the Restaurant A because the User B has an importance value equal to 10 to the User A. Likewise, if the User C "Likes" the Restaurant C, the server application 180 may assign 1 point to the Restaurant C because the User C has an importance value equal to 1. Therefore, in this example, it will take at least 10 additional positive "Like" ratings by users with an importance value equal to 1 to increase the total points of the Restaurant C above the total points assigned to the Restaurant A (which was "liked" by someone with an importance of "10").

Figure 7:
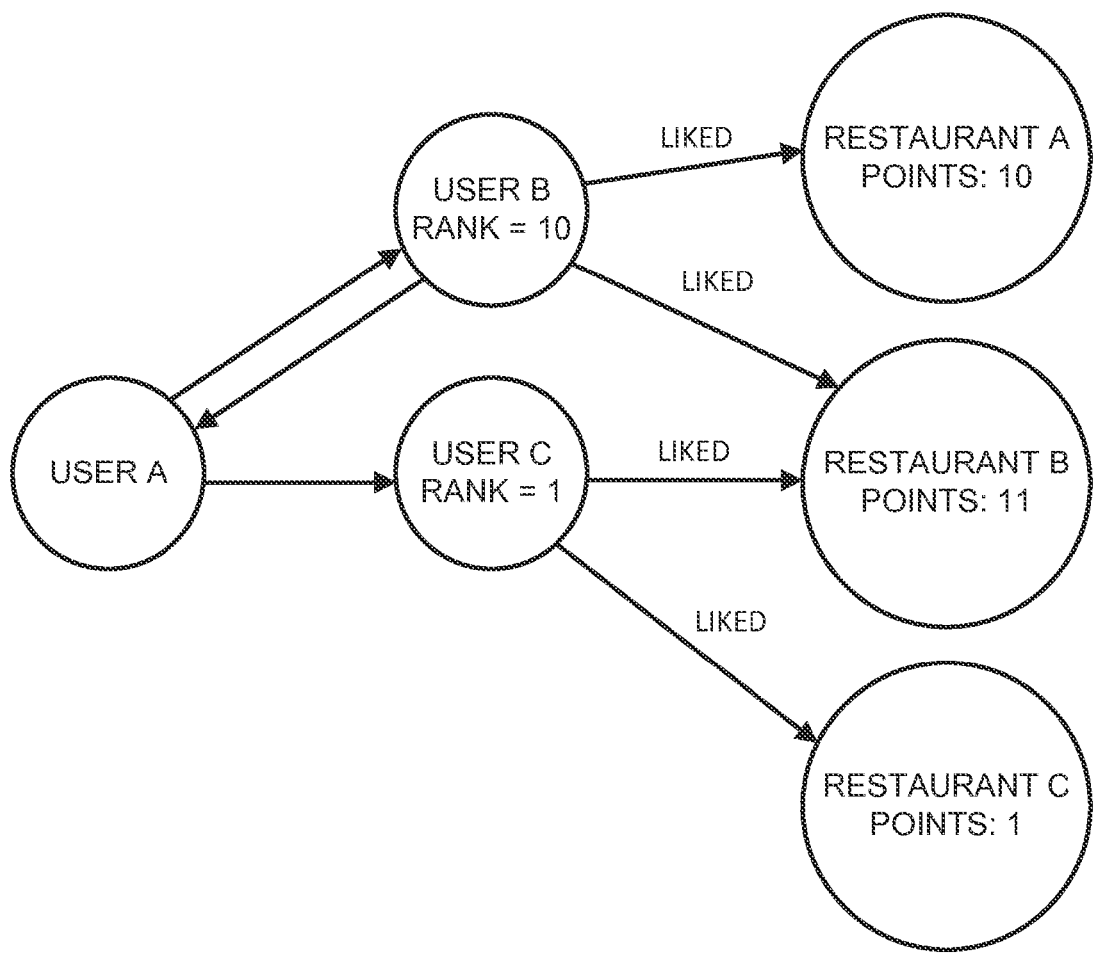
FIG. 7 is an illustration of a portion of the social graph of FIG. 1 illustrating restaurants liked by the Users B and C.

In the example illustrated in FIG. 7, both the Users B and C indicated they "Like" the Restaurant B. Thus, the Restaurant B is assigned 11 points by the server application 180. In this example, when the User A performs the search, the search results may be ordered as follows in block 420:

1. Restaurant B;
2. Restaurant A; and
3. Restaurant C.

Alternatively, the points may be calculated as a multiple of the importance value and may be combined with other factors. By way of another non-limiting example, the importance value may simply be one parameter used to calculate the point value(s) or ranking(s) assigned to the Restaurant A, the Restaurant B, and/or the Restaurant C.

If the search results were assigned points based on proximity ratings, compatibility ratings, and/or social rank values, in block 420, the points based on the importance rating may be included therewith (e.g., the points based on the importance rating may be added thereto).

In block 425, the client application 160 receives at least a portion of the search results obtained in block 415 from the server application 180 and displays the search results received to the user who requested the web search in accordance with the evaluation performed in block 420. By way of a non-limiting example, in block 425, the search results including Restaurants A, B, and C may be displayed in the order indicated above: (1) Restaurant B; (2) Restaurants A; and (3) Restaurants C.

After block 425, the method 400 terminates.

The evaluation performed in block 420 may go a long way toward preventing spam and abuse. The User A is very unlikely to assign a spammer an importance rank of "10" as it may have negative effects for the rest of the User A's social networking experience (outside the social search). Furthermore, people with stronger relationships are more likely to share similar tastes and interests. Further still, it should be re-iterated that importance values and/or importance ranks may not necessarily reflect the strengths of relationships because a particular relationship may not even be mutual. For example, if a user assigns an importance value of 10 to a celebrity, it may be inferred that the user has at least remotely similar tastes to those of the celebrity, even though the celebrity may not have met the user.

Proximity Rating

In the embodiments described above with respect to importance rating, members having a direct relationship (or a first degree connection) with the User A are assigned an importance rating. The server application 180 may also be configured to assign a proximity rating to the nodes of the User A's social graph representing members of the social network. Proximity rating may be determined at least in part based on a graph distance value, and/or a physical distance value. The graph distance value is a measure of how close the member is to the User A on the User A's social graph 10. The physical distance value is a measure of how close the member is located to the User A in the physical world.

Figure 4C:
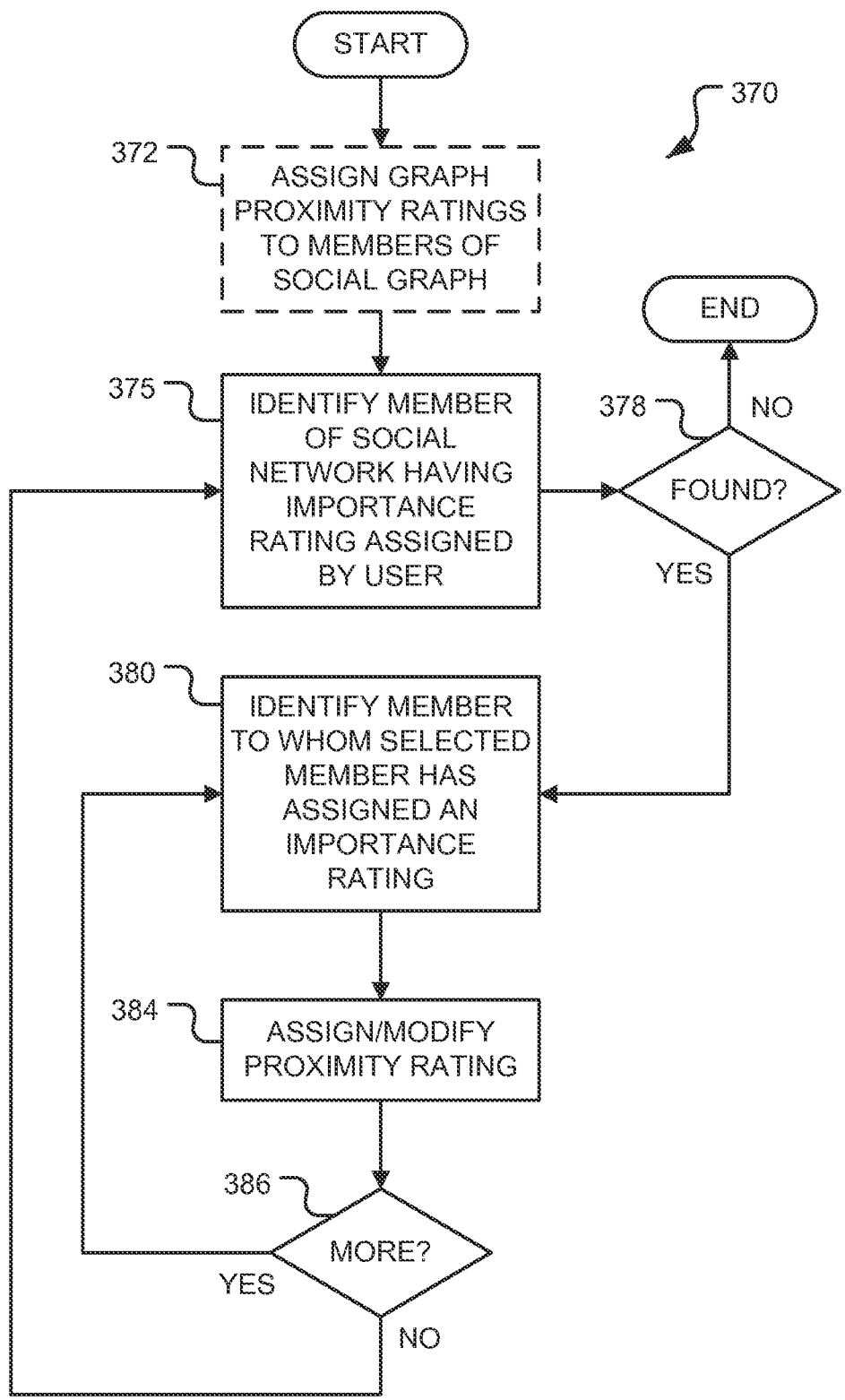
FIG. 4C is a flow diagram of a method of assigning and/or modifying proximity ratings based on importance rating.
Figure 4D:
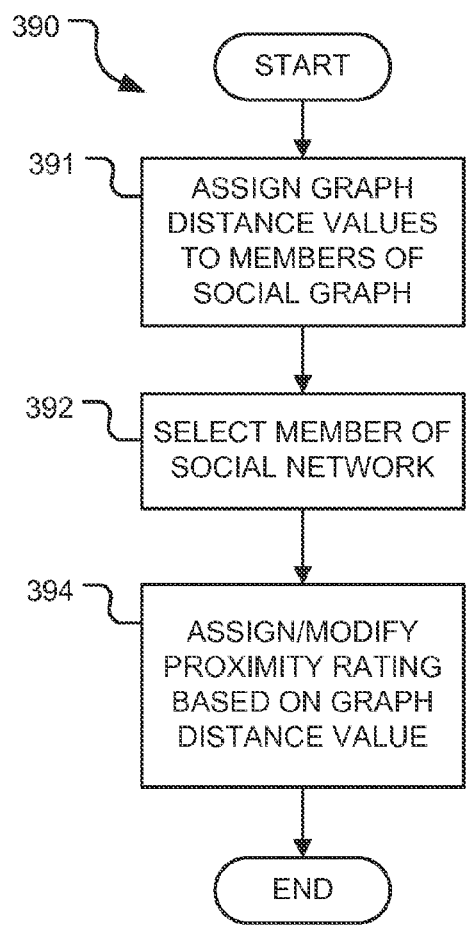
FIG. 4D is a flow diagram of a method of assigning proximity ratings to members of a social network using graph distance values.

FIG. 4D is a flow diagram of a method 390 of assigning proximity ratings and/or modifying proximity ratings assigned to members of a social network based at least in part on graph distance values. In first block 391, the server application 180 assigns graph distance values to the nodes of the User A's social graph 10. As is apparent to those of ordinary skill in the art, a node within a social graph may be connected to another node via multiple paths within the social graph. In other words, multiple distances between nodes may be calculated (each along a different path). For example, referring to FIG. 1, the User A is connected to the User C via both a first degree connection (e.g., having a graph distance value=1) and a second degree connection (e.g., having a graph distance value=2). Thus, two distances between nodes representing the Users A and C would be present in the social graph 10. One of these distances may be selected as the graph distance value. By way of a non-limiting example, shortest distance may be used to determine the graph distance value for a particular node with respect to the User A. In this example, the graph distance value of 1 would be used.

In block 392, the server application 180 selects a member of the social network. The member selected may be one to which a proximity rating has or has not yet been assigned. The member selected may be one to which an importance rating has not been assigned by the User A. For ease of illustration, in block 392, the User F is selected.

In block 394, the server application 180 assigns a proximity rating to the member selected in the block 392 based on the graph distance value assigned to the member selected in the block 392.

For example, referring to FIG. 1, a first predetermined proximity rating may be automatically assigned to nodes (e.g., the node representing the User F) connected to the node representing the User A via a second degree connection (having a graph distance value=2). By way of a non-limiting example, the nodes (e.g., the User F) connected to the node representing the User A via a second degree connection may be assigned an proximity rating equal to 2.

Similarly, a second predetermined proximity rating may be automatically assigned to each node (e.g., the User G) connected to the node representing the User A via a third degree connection (having a graph distance value=3). By way of a non-limiting example, the nodes (e.g., the User G) connected to the node representing the User A via a third degree connection may be assigned a proximity rating equal to 1. Thus, in this example, nodes connected to the node representing the User A by a second degree connection are given a higher proximity rating than nodes connected to the node representing the User A by a third degree connection. This reflects an inference that nodes closer to the User A are more likely to have similar interests to the User A. Thus, proximity to the node representing the User A on the social graph associated with the User A may be used to automatically assign proximity rating to other nodes.

As is apparent to those of ordinary skill in the art, nodes directly connected to the node representing the User A (nodes having a first degree connection to the node representing the User A) may also be assigned a predetermined proximity rating (e.g., a proximity rating equal to 3). The members represented by such nodes may have been assigned a graph distance value equal to 1.

If a proximity rating was assigned previously to the member, in block 394, the proximity rating may be modified. For example, if the member previously had a third degree connection with the User A but now has a second degree connection, the proximity rating could be increased. Further, if the proximity rating was low for the degree of connection, the proximity rating could be increased. Alternatively, if the proximity rating was high for the degree of connection, the proximity rating could be decreased.

Then, the method 390 terminates.

The method 390 may be repeated for all of the nodes of the social graph 10 or a portion thereof. For example, the method 390 may be performed for any nodes not connected to a node to which the User A has assigned an importance rating. Such nodes may be located by a conventional traversal of the social graph.

The social graph 10 may be traversed from the closest nodes to the User A to those farthest from the User A. However, this is not a requirement.

While in the method 390 the graph distance values are determined for the nodes before the proximity ratings are assigned, this is not a requirement. In alternate embodiments, the proximity rating may be assigned to a node before the graph distance value has been determined for that node.

Figure 4E:
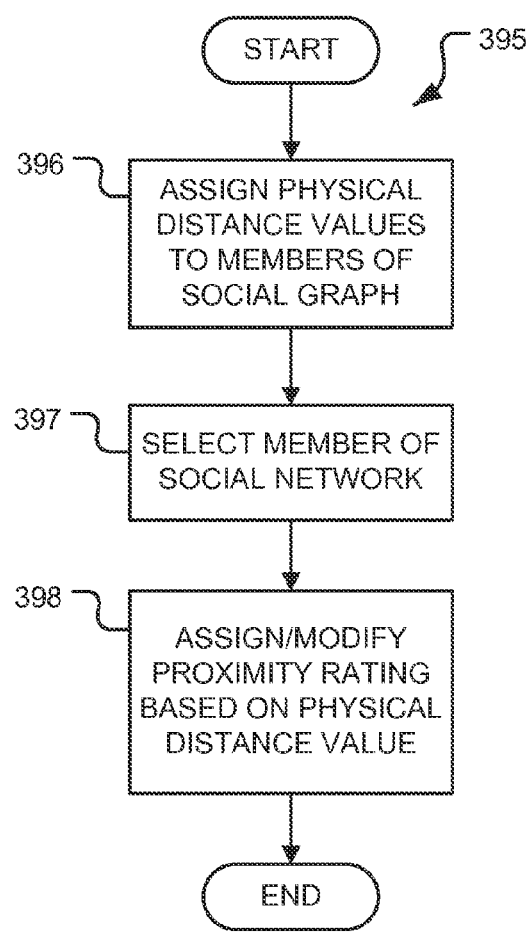
FIG. 4E is a flow diagram of a method of assigning proximity ratings to members of a social network using physical distance values.

FIG. 4E is a flow diagram of a method 395 of assigning and/or modifying proximity ratings assigned to members of a social network based on physical distance values.

In first block 396, physical distance values are assigned to the nodes of the User A's social graph 10. The physical distance value assigned to a node may be a numeric value representing the difference in physical distance (e.g. in miles or kilometers) between the User A and the node. Furthermore, a higher proximity rating (e.g., a proximity rating of 1000) may carry more influence than a lower proximity rating (e.g., a proximity rating of 1). The server application 180 may determine (or "fetch") a member's location and/or the User A's location using social data, profile data, an Internet Protocol address, and the like. Alternatively, the server application 180 may ask the member and/or User A directly for location information.

In block 397, a node of the User A's social graph 10 representing a member of the social network is selected. The member selected may be one to which a proximity rating has or has not yet been assigned. For ease of illustration, in block 397, the User F is selected. An importance rating may or may not have been assigned to the member selected in the block 397 by the User A.

In block 398, a proximity rating is assigned to the member selected in the block 397 based on physical distance between the User A and the member selected in the block 397. For example, if the Users A and F are located in the same city, a high proximity rating (e.g., a proximity rating=10) may be assigned to the User F. On the other hand, if the Users A and F are located far from one another (e.g., in different countries), a low proximity rating (e.g., a proximity rating=1) may be assigned to the User F.

If a proximity rating was assigned previously to the member, in block 398, the proximity rating may be modified. For example, if the member was previously located a large physical distance from the User A but is now located much closer to the User A, the proximity rating could be increased. Further, if the proximity rating was low for the amount of physical distance between the selected member and the User A, the proximity rating could be increased. Alternatively, if the proximity rating was high for the amount of physical distance between the selected member and the User A, the proximity rating could be decreased.

If the server application 180 is unable to determine the physical distance between the User A and the member selected in the block 397, a default value (e.g., physical distance value=0) may be assigned to the member selected in the block 397.

Then, the method 395 terminates.

Blocks 397 and 398 may be repeated for all of the nodes of the social graph 10 or a portion thereof. Such nodes may be located by a conventional traversal of the social graph. The social graph 10 may be traversed from the closest nodes to the User A to those farthest from the User A. However, this is not a requirement.

While in the method 395 the physical distance values are determined for the nodes before the proximity ratings are assigned, this is not a requirement. In alternate embodiments, the proximity rating may be assigned to a node before the physical distance value has been determined for the node.

One or both of the methods 390 and 395 may be performed. For example, the method 390 may be performed to assign a proximity rating to the nodes of the social graph 10. Then, the method 395 may be performed and used to modify the proximity ratings assigned to the nodes. Alternatively, the method 395 may be performed to assign a proximity rating to the nodes of the social graph 10. Then, the method 390 may be performed and used to modify the proximity ratings assigned to the nodes.

FIG. 4C is a flow diagram of a method 370 of assigning and/or modifying the proximity rating assigned to members of a social network using the importance rating assigned to the members.

In first optional block 372, proximity ratings are assigned to the nodes of the User A's social graph 10. One or both of the methods 390 and 395 may be performed in block 372. Thus, the proximity ratings may be based on graph distance values and/or physical distance values.

In block 375, the server application 180 tries to identify a node representing a member having an importance rating assigned by the User A. For example, referring to FIG. 1, the node representing the User B may be identified. The node representing the User B has a first degree connection with the User A (e.g., a graph distance value=1). In this example, the User B has assigned importance values equal to 10 and 1 to the Users F and H, respectively.

In decision block 378, the server application 180 determines whether a node was identified in the block 375. The decision in decision block 378 is "YES" when a node was identified. Otherwise, the decision in decision block 378 is "NO" when a node was not identified. When the decision in decision block 378 is "YES," the server application 180 advances to block 380. When the decision in decision block 378 is "NO," the method 370 terminates.

In block 380, the server application 180 identifies a member connected to the member identified in block 375 to which the member identified in block 375 has assigned an importance rating. For example, referring to FIG. 1, in block 380, the node representing the User F may be selected. The node representing the User F has a second degree connection with the User A, and a first degree connection with the User B.

In block 384, a proximity rating is assigned to the member identified in block 380. As mentioned above, the User B assigned importance values equal to 10 and 1 to the Users F and H, respectively. This means the User B values the User F more than the User H. Therefore, the server application 180 may infer (or assume) that the User A will also value the opinions of the User F more than the opinions of the User H. Thus, the server application 180 may simply assign a proximity rating to the User F that is greater than that assigned to the User H. By way of another non-limiting example, the server application 180 may assign a proximity rating to the User F calculated (or otherwise determined) based on the importance rating assigned to the User F by the User B. For example, the proximity rating assigned to the User F may be identical to the importance rating assigned by the User B.

If a proximity rating was assigned previously to the member selected in block 380, in block 384, the proximity rating may be modified. For example, if the member previously had a low proximity value but was assigned a large importance rating by the User B, the proximity rating could be increased. Further, if the member previously had a high proximity value but was assigned a low importance rating by the User B, the proximity rating could be decreased.

In another example, the proximity rating assigned to the User F may be a multiplication or addition of a proximity rating assigned to the User F based on the graph distance value of the User F relative to the User A (e.g., a graph distance value equal to 2 may be assigned if the graph distance value indicates a second degree connection), and the importance rating assigned to the User F by the User B (e.g. 10). In this example, the User F's proximity rating may be set equal to 20 (2*10=20), or 12 (2+10=12). Further still, the importance rating assigned to the User B by the User A may also be taken into account (such as, but not limited to, via addition or multiplication) for determining or modifying the User F's proximity rating. By way of another non-limiting example, the importance ratings of the Users B and/or User A may be used to simply rank the Users F and H. In such embodiments, the proximity rating includes an order with respect to these users.

In decision block 386, the server application 180 determines whether the member selected in block 375 (e.g., the User B) assigned importance ratings to any other members (e.g., the User H). The decision in decision block 386 is "YES" when the member selected in block 375 (e.g., the User B) assigned importance ratings to at least one other member (e.g., the User H). Otherwise, the decision in decision block 386 is "NO" when the member selected in block 375 (e.g., the User B) has not assigned importance ratings to any other members. When the decision in decision block 386 is "YES," the server application 180 returns to block 380 to select another member to which the member selected in block 375 (e.g., the User B) assigned an importance rating. When the decision in decision block 386 is "NO," the server application 180 returns to block 375 to identify another node representing a member having an importance rating assigned by the User A.

Blocks 375-386 may be repeated for all of the nodes of the social graph 10 or a portion thereof. Such nodes may be located by a conventional traversal of the social graph. The social graph 10 may be traversed from the closest nodes to the User A to those farthest from the User A. However, this is not a requirement.

FIG. 5B is a flow diagram of a method 450 of using proximity ratings to evaluate and display search results obtained from a web search. In first block 460, the client application 160 receives search criteria (e.g., one or more search terms) from the user. For ease of illustration, in this example, the User A will be described as conducting the search. Further, the User A will be described as conducting a search for a restaurant in a particular city (e.g., Seattle). Thus, the exemplary search criteria received by the client application 160 may include search terms such as "restaurant" and "Seattle."

In block 465, the server application 180 obtains search results using the search criteria received in block 460. Thus, in block 465, the client application 160 forwards the search criteria to the server application 180, and the server application conducts a web search using the search criteria. The web search may be conducted by the web search engine 189 of the social search application 186 of the server application 180. Alternatively, the web search may be conducted by a search engine (e.g., a search engine operated by Google, Yahoo, and the like) that returns the search results to the server application 180. In the example where the User A is searching for a restaurant in Seattle, the search results may identify three restaurants: Restaurant A, Restaurant B, and Restaurant C.

In block 470, the server application 180 evaluates the search results obtained in block 465 based on the proximity rating assigned to the members of the user's social network. The evaluation process may assign points to each of the search results that may be used to filter and/or sort the search results. Continuing the above example, the User B has "voted up" the Restaurant A and the User C has "voted up" the Restaurant C. In this example, the Users B and C were assigned proximity ratings equal to 10 and 1, respectively.

Since the User B was assigned a proximity rating equal to 10, the User B's rating will be given more weight than the User C's rating (who has a proximity rating equal to 1). Therefore, ignoring Restaurant B for the moment, in block 470, the search results may be ranked or ordered based on the proximity ratings assigned to the Users B and C as follows:
3. Restaurant A; and
4. Restaurant C.

Referring to FIG. 6A and as discussed above, the ratings (e.g., "voting up") used in block 470 may have been obtained via the rating interface 500.

If the User B "Likes" the Restaurant A, the server application 180 may assign 10 points to the Restaurant A because the User B has a proximity rating equal to 10 to the User A. Likewise, if the User C "Likes" the Restaurant C, the server application 180 may assign 1 point to the Restaurant C because the User C has a proximity rating equal to 1. If both the Users B and C indicated they "Like" the Restaurant B, the Restaurant B may be assigned 11 points by the server application 180. In this example, when the User A performs the search, the search results may be ordered as follows in block 470:
1. Restaurant B;
2. Restaurant A; and
3. Restaurant C.

Alternatively, the points may be calculated as a multiple of the proximity rating and may be combined with other factors. By way of another non-limiting example, the proximity rating may simply be one parameter used to calculate the point value(s) or ranking(s) assigned to the Restaurant A, the Restaurant B, and/or the Restaurant C.

If the search results were assigned points based on importance ratings, compatibility ratings, and/or social rank values, in block 470, the points based on the proximity rating may be included therewith (e.g., the points based on the proximity rating may be added thereto).

In block 475, the client application 160 receives at least a portion of the search results obtained in block 465 from the server application 180 and displays the search results received to the user who requested the web search in accordance with the evaluation performed in block 470. By way of non-limiting example, in block 475, the search results including Restaurants A, B, and C may be displayed in the order indicated above: (1) Restaurant B; (2) Restaurants A; and (3) Restaurants C.

After block 475, the method 450 terminates.

Compatibility Rating

At times, even best friends may not share the same interests, tastes, and/or preferences. For example, assuming the User B is one of User A's best friends, the User B may not necessarily share the same taste in food as the User A. Thus, which restaurants the User B "Likes" may not matter to the User A. In fact, the User A may have more in common with the User C in terms of tastes in food. Therefore, with respect to tastes in food, the User C may be considered to be more compatible with the User A.

FIG. 8A is a flow diagram of a method 600 of determining a compatibility rating for a node (representing a member) on a user's social graph with respect to a selected compatibility topic (e.g., restaurant preferences). For ease of illustration, the method 600 will be described with respect to the User A and the User A's social graph 10 illustrated in FIG. 1.

In first block 605, a compatibility topic is selected. Optionally, an initial or default value (e.g., a compatibility rating=0)

may be assigned to each of the nodes of the social graph 10 (illustrated in FIG. 1) for the selected compatibility topic.

The compatibility topic may be inferred or determined from the search criteria received in block 660 of a method 650 illustrated in FIG. 8B and described below. Alternatively, the compatibility topic may be selected arbitrarily. For example, the server application 180 may comb through a list of predetermined compatibility topics or user profiles to identify topics. By way of a non-limiting example, the user's social data may be analyzed and grouped (or clustered) to identify compatibility topics using machine learning techniques. By way of another non-limiting example, "natural language processing," or other techniques (e.g., artificial intelligence techniques) may be used to identify compatibility topics. By way of yet another non-limiting example, the server application 180 and/or the client application 160 may ask the user to input one or more compatibility topics. Alternatively, compatibility topics may simply be keywords or key phrases obtained from user profiles and associated social data.

By way of another non-limiting alternate embodiment, a predetermined compatibility topic may be selected from a list of topics in block 605. Optionally, an initial or default value (e.g., a compatibility rating=0) may be assigned to each of the nodes of the social graph 10 (illustrated in FIG. 1) for each of the topics in the list. A non-limiting exemplary list of compatibility topics may include the following:

1. Overall compatibility;
2. Restaurant preference compatibility;
3. Hotel preference compatibility;
4. Travel/Vacation preference compatibility; and
5. Hobby compatibility The overall compatibility topic may be used to compare the overall compatibility of a user (e.g., the User A) with another member on the social network (represented by a node on the user's social graph).

Sub-topics may be defined within one or more of the compatibility topics. For example, a restaurant preferences compatibility topic may include the following sub-topics: location, type of food, and the like.

Thus, portions of the social data relevant to the compatibility topics (referred to as "compatibility data") may be categorized or grouped so that nodes on the User A's social graph representing members of the social network that have the same tastes in food as the User A may not impact the User A's search results for travel (hotels, travel destinations, tourist attractions, etc.) or entertainment. The sub-topics may be used so that nodes representing members of the social network who have the same tastes in Chinese restaurants as the User A will not exert the same amount of influence on a search for Mexican restaurants.

For ease of illustration, in this example, in block 605, the compatibility topic selected is "restaurant preferences compatibility."

In block 610, a node on the User A's social graph or a member of the social network is selected. For ease of illustration and by way of an example, the User C is selected. The method 600 may be repeated for all or a portion of the nodes on the User A's social graph 10. In some embodiments, the method 600 may be repeated for all or a portion of the members of the social network.

In next block 615, the server application 180 compares at least a portion of the "social data" associated with the User A with at least a portion of the "social data" associated with the user selected in block 610, which in this example is the User C. This comparison may determine whether the Users A and C have similar tastes and preferences by checking for compatible "Likes" or ratings in the social data associated with the Users A and C. For example, if both the User A and the User C have indicated that they "Like" the Restaurant B, this data may be used by the server application 180 to determine that the Users A and C have similar restaurant preferences and may therefore, be at least somewhat compatible with respect to the restaurant preferences compatibility topic. However, the server application 180 may ignore levels of compatibility that are not statistically significant. Thus, similarities in compatibility may not affect the evaluation of the search results (e.g., in block 670 of a method 650 described below and illustrated in FIG. 8B) unless the level of compatibility is "statistically significant."

In block 620, a compatibility rating is assigned to the member selected in block 610 (e.g., the User C) for the compatibility topic selected in block 605. As discussed above, in block 615, the User A's profile and social data, may be compared to the user profile and social data of another member (e.g., the User C). Then, in block 620, a compatibility rating may be assigned to the other member based on how similar the two are determined to be by the results of the comparison. For example, a compatibility rating may be assigned based on a scale having a predetermined range (e.g., from 0 to 10).

The compatibility rating may be expressed as a percentage (e.g., 0% to 100%) calculated based on the results of the comparison. For example, if the User A has generated a total of ten status updates and all of them included the keyword "football," the server application 180 may infer the User A is interested ONLY in football. Similarly, if the User C has generated a total of ten status updates and all of them included the keyword "football," the server application 180 may infer the User C is also interested in ONLY football. In this example, the compatibility rating for the User C (with respect to the User A) may be set to 100%. Further, if compatibility topics are used, the compatibility rating for the User C (with respect to the User A) for a "football" compatibility topic and/or "sports" compatibility topic may be set to 100%.

By way of another non-limiting example, the User A may manually assign (via a user interface substantially similar to the importance rating interface 530 illustrated in FIG. 6B) a compatibility rating to the other member.

After the compatibility rating is determined, the server application 180 may optionally store the compatibility rating in the server 150 (e.g., in the social network data 188) and/or in a database.

Then, the method 600 terminates. At this point, for a particular compatibility topic and a particular member (e.g., the User C) of the social network, the method 600 has determined a compatibility rating that may be used to select and/or sort search results returned in response to a web search initiated by the user (e.g., the User A) associated with the social network.

The method 600 may be performed at any time regardless of whether a search is being performed (e.g. all of a user's interests may be crawled at any time and compatibility ratings determined for at least a portion of the nodes in the user's social graph).

As mentioned above, the method 600 may be performed each time search criteria are received in the block 660 of the method 650 illustrated in FIG. 8B (described below). In such embodiments, instead of selecting a compatibility topic, in block 605, the search criteria may be used as the compatibility topic. Further, only portions of the search criteria may be used. For example, if the search criteria includes the search terms "Mexican restaurants near Seattle," the server application 180 may optionally parse out some of the search terms, such as the term "near." If the search criteria includes the search terms "Mexican restaurants" and "Seattle," in block 615, the server application 180 may compare portions of the social data of the User A relevant to both "Mexican restaurants" and "Seattle" with portions of the social data of the User C relevant to both "Mexican restaurants" and "Seattle." Then, in block 620, determine a compatibility rating for the User C with respect to the search criteria based on the comparison conducted in block 615.

Alternatively, instead of performing the method 600, the server application 180 and/or the client application 160 may ask the User A to rate (manually) members of the social network with respect to one or more compatibility topics (and, if appropriate, relevant sub-topics) to obtain a compatibility rating for each compatibility topic (and any relevant sub-topics). Manual ratings may be entered using a user interface substantially similar to the importance rating interface 530 illustrated in FIG. 6B.

Statistics for refining the search results may be obtained by analyzing responses received from the User A in response to questions asking the User A whether search results returned by a web search are relevant. Further, the User A may be asked whether specific search results are relevant to a particular compatibility category. For example, the User A may be asked if a particular restaurant returned by a web search is relevant to the User A's restaurant preferences.

Using the method 600, social data (including, for example, comments, status updates, messages, and other social data) may be analyzed to determine compatibility ratings. For some compatibility topics, related types of compatibility and similarity may be used when determining the compatibility rating in block 620. For example, some compatibility topics may have a location component such that members of the social network within the local area of the User A should be given more weight (or considered to be more compatible with the User A) than other members of the social network. For example, Seattle locals may know more about restaurants in Seattle than tourists do.

As mentioned above, the method 600 may be performed for each node in User A's social graph 10 representing a member of the social network. In some embodiments, the method 600 may be repeated until a member is identified having a compatibility rating above a predetermined threshold. Thus, the method 600 may be repeated for members having second degree connections (friends of friends), third degree connections, and so on. For example, the method 600 may not find any direct friends or contacts (first degree connections) assigned a sufficiently high compatibility rating, but friends of friends, third degree connections, fourth degree connections, etc. may be determined to be sufficiently compatible with the User A.

FIG. 8B is a flow diagram of a method 650 of using the compatibility ratings determined by the method 600 to evaluate and display search results returned by a web search. In first block 660, the client application 160 receives search criteria (e.g., one or more search terms) from the user. For ease of illustration, in this example, the User A will be described as conducting the search. Further, the User A will be described as conducting a search for a restaurant in a particular city (e.g., Seattle). Thus, the exemplary search criteria received by the client application 160 may include search terms such as "restaurant" and "Seattle." If a location is not specified, the server application 180 may determine (or "fetch") location information from the User A's social data, profile data, the user's IP address, and the like. Alternatively, the client application 160 may ask the user directly for location information and forward the location information to the server application 180.

In block 665, the server application 180 obtains search results using the search criteria received in block 660. Thus, in block 665, the client application 160 forwards the search criteria to the server application 180 and the server application conducts a web search using the search criteria. The web search may be conducted by the social search application 186 of the server application 180. Alternatively, the web search may be conducted by a search engine (e.g., a search engine operated by Google, Yahoo, and the like) that returns the search results to the server application 180. In the example where the User A is searching for a restaurant in Seattle, the search results may identify three restaurants: Restaurant A, Restaurant B, and Restaurant C.

In block 670, the server application 180 evaluates the search results obtained in block 665 based on at least one compatibility rating assigned to a member of the social network (implemented by the social network service application 184). Thus, in block 670, the server application 180 identifies a compatibility topic associated with the search criteria received in the block 660. Then, the server application 180 obtains the compatibility rating assigned to one or more members of the social network (implemented by the social network service application 184) who may be associated with the User A for the compatibility topic identified. In this example, the Users B and C were assigned compatibility ratings of 10 and 1, respectively, with respect to the compatibility topic identified.

The evaluation process may assign points to each of the search results that may be used to filter and/or sort the results. In the example illustrated in FIG. 7, the User B has "voted up" the Restaurants A and B; and, the User C has "voted up" the Restaurants B and C. Since the User B was assigned a compatibility rating equal to 10, the User B's rating will be given more weight than the User C's rating (who has a compatibility rating equal to 1). Therefore, in block 670, the search results may be ranked or ordered based on the compatibility ratings assigned to the Users B and C as follows:

1. Restaurant B;
2. Restaurant A; and
3. Restaurant C.

The ratings (e.g., "voting up") used in block 670 may have been obtained via the rating interface 500 illustrated in FIG. 6A. The server application 180 may assign a point value to each search result. Point values may be determined by how compatible the user who "Liked" or "Disliked" a search result is with the User A with respect to the compatibility topic. For example, if the User B "Likes" the Restaurant A, the server application 180 will assign 10 points to the Restaurant A because the User B has a compatibility rating equal to 10 with respect to the compatibility topic. Alternatively, the points may be calculated as a multiple of the compatibility rating and may be combined with other factors. Likewise, if the User C "Likes" the Restaurant C, the server application 180 will assign 1 point to the Restaurant C because the User C has a compatibility rating equal to 1.

If the search results were assigned points based on proximity ratings, importance ratings, and/or social rank values, in block 670, the points based on the compatibility rating may be included therewith (e.g., the points based on the compatibility rating may be added thereto).

In block 675, at least a portion of the search results obtained in block 665 are displayed to the user who requested the web search in accordance with the evaluation performed in block 670. For example, the search results including Restaurants A, B, and C may be displayed in the order indicated above: (1) Restaurant B; (2) Restaurants A; and (3) Restaurants C. After block 675, the method 650 terminates.

Social Rank

While evaluating search results based on compatibility (or similarity) with the User A may be useful, it may also be useful to consider expertise when evaluating search results. This may be particularly helpful if any member of the social network may vote with respect to (e.g., indicate the member "Liked") any item of interest. In such a system, expert votes may be intermixed with non-expert votes. Therefore, the ability to identify votes provided by subject matter experts and assign such votes greater weight could be used to select and/or sort search results returned by a web search.

Figure 9A:
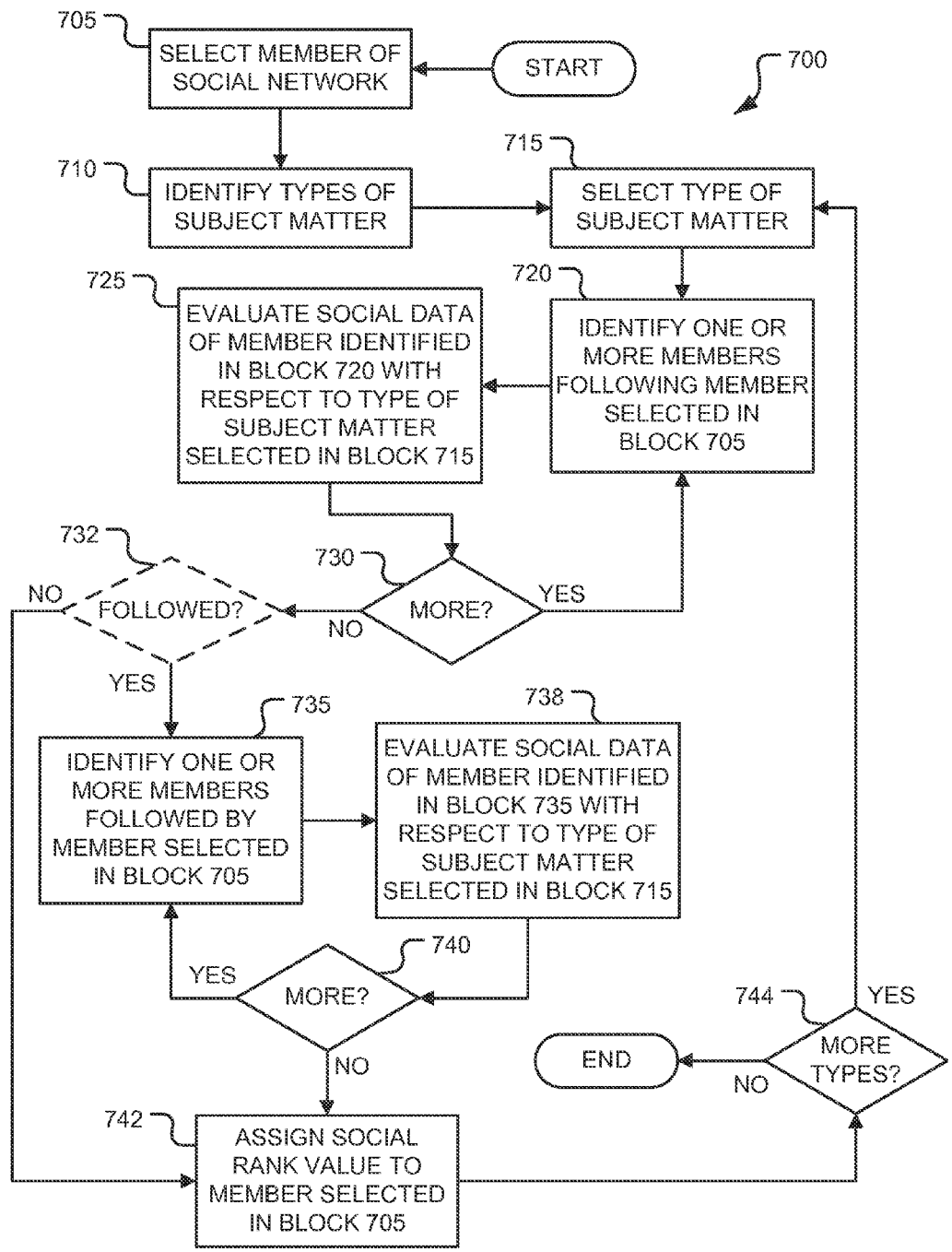
FIG. 9A is a flow diagram of a method of identifying one or more types of subject matter about which a member of the social network may have at least some expertise, and for each type of subject matter identified, assigning a social rank value to the member that indicates the member's voting power with respect to a particular type of subject matter.

FIG. 9A is a flow diagram of a method 700 of identifying one or more types of subject matter about which a member of the social network may have at least some expertise, and for each type of subject matter identified, assigning a social rank value to the member that indicates the member's voting power with respect to a particular type of subject matter. For ease of illustration, the method 700 will be described with respect to the User A and the User A's social graph 10 illustrated in FIG. 1.

In first block 705, the server application 180 selects a node of the User A's social graph 10 representing a member of the social network (implemented by the social network service application 184). For ease of illustration and by way of an example, in block 705, the node representing the User C is selected. Optionally, an initial or default value (e.g., a social rank value=0) may be assigned to the node in block 705. For example, if the selected node does not have a social rank value, the initial value may be assigned to the selected node. The method 700 may be repeated for all or a portion of the nodes of the User A's social graph 10. Furthermore, the method 700 may optionally be repeated for all or a portion of the members of the social network (implemented by the social network service application 184).

In block 710, the server application 180 identifies one or more types of subject matter by analyzing the social data associated with the member selected in block 705. For example, the server application 180 may examine status updates generated by the User C and extract the most prominent keywords and phrases from those status updates. The server application 180 may then sort these keywords and phrases based on prominence and/or usage. For example, if the most prominent keywords in the User C's status updates are "basketball" and/or the names of professional basketball players, the server application 180 may infer that the member is interested in basketball. Thus, a type of subject matter corresponding to basketball may be identified in block 710.

In block 710, the User C's social data may be analyzed and grouped (or clustered) to identify one or more types of subject matter using machine learning techniques. By way of another non-limiting example, "natural language processing," or other techniques (e.g., artificial intelligence techniques) may be used to identify types of subject matter. By way of another non-limiting alternate embodiment, a predetermined type of subject matter may be selected from a list of types of subject matter. Optionally, sub-types may be defined within one or more of the type of subject matter.

Next, the method 700 tries to locate other members of the social network whose social data supports a conclusion that the member selected in block 705 is knowledgeable with respect to the one or more types of subject matter identified in block 710.

In block 715, the server application 180 selects one of the types of subject matter identified in block 710 (e.g., "basketball").

In block 720, the server application 180 identifies one or more members following the member (e.g., User C) selected in block 705. In the social graph 10, the Users D and J are following the User C. For ease of illustration, the User J may be selected in block 720. In this example, the User J has assigned an importance value equal to 10 to the User C.

In block 725, the server application 180 evaluates the social data associated with one of the members (e.g., the User J) identified in block 720 to determine whether the member (e.g., the User J) is interested in the type of subject matter selected in block 715 (e.g., basketball). In block 725, the server application 180 may examine status updates generated by the User J and extract the most prominent keywords and phrases from those status updates. If the most prominent keywords in the User J's status updates are "basketball" and/or the names of professional basketball players, the server application 180 may infer that the User J is interested in basketball. The User J's social data may be analyzed and grouped (or clustered) using machine learning techniques to infer a level of interest of the User J in the type of subject matter (e.g., basketball). By way of another non-limiting example, "natural language processing," or other techniques (e.g., artificial intelligence techniques) may be used to infer a level of interest of the User J in the type of subject matter (e.g., basketball).

If the User J is interested in basketball, the User J's importance rating of the User C may reflect the User J's belief that the User C has expertise with respect to basketball. In this situation, the User C's social rank value may be increased (e.g., by a predetermined amount) with respect to the type of subject matter corresponding to basketball. For example, if the User C has a social rank value of 0 in block 705, in block 725, the User C's social rank value may be increased by a predetermined amount. By way of a non-limiting example, the User C's social rank value may be increased by 1 to 1. By way of another non-limiting example, the User C's social rank value may be increased by the importance value that the User J assigned to the User C.

Optionally, the social rank value of the member identified in block 720 (e.g., the User J) may be considered when evaluating the social rank value of the member selected in block 705 (e.g., the User C). For example, if the User J has a social rank value equal to 10 with respect to the type of subject matter selected in block 715 (e.g., basketball), and has assigned an importance value equal to 10 to the User C, the server application 180 may increase the social rank value of the User C as a function of the User J's social rank value and the importance rating the User J assigned to the User C. For example, the server application 180 may increase the social rank value of the User C by the product of the User J's social rank value and the importance rating the User J assigned to the User C (10*10=100), the sum of the User J's social rank value and the importance rating the User J assigned to the User C (10+10=20), and the like.

On the other hand, if the User J is not interested in basketball, the User J's importance rating of the User C may be independent of the User C's expertise with respect to basketball. In this situation, the User C's social rank value may remain unchanged or may be decreased with respect to the type of subject matter corresponding to basketball. For example, if the User C has a social rank value of 0 in block 705, in block 725 the User C's social rank value may be decreased by a predetermined amount. By way of a non-limiting example, the User C's social rank value may be decreased by 1 to −1. Alternatively, in block 725 the User C's social rank value may remain unchanged.

Optionally, the social rank value may be limited to being at most a maximum value. Similarly, the social rank value may be limited to being greater than or equal to a minimum value.

In decision block 730, the server application 180 determines whether additional members (other than the User J) were identified in block 720. The decision in decision block 730 is "YES" when additional members were identified. Otherwise, the decision in decision block 730 is "NO" when additional members were not identified. When the decision in decision block 730 is "YES," the server application 180 returns to block 720 to select a different member. On the other hand, when the decision in decision block 730 is "NO," the server application 180 advances to optional decision block 732.

In optional decision block 732, the server application 180 decides whether to consider members followed by the member (e.g., User C) selected in block 705. When the server application 180 decides to consider members followed by the member (e.g., User C) selected in block 705, the decision in decision block 732 is "YES" and the server application 180 advances to block 735. On the other hand, when the server application 180 decides not to consider members followed by the member (e.g., User C) selected in block 705, the decision in decision block 732 is "NO" and the server application 180 advances to block 742.

In block 735, the server application 180 identifies one or more members followed by the member (e.g., User C) selected in block 705. In the social graph 10, the Users D and I are followed by the User C. Thus, in this example, the User I may be identified in block 735. In this example, the User I has assigned an importance value equal to 8 to the User C.

If a particular member is both followed by and following the User C, that particular member may be omitted in the block 735 because the social data of that particular member was already evaluated in block 725.

In block 738, the server application 180 evaluates the social data associated with one of the members (e.g., the User I) identified in block 735 to determine whether the member (e.g., the User I) is interested in the type of subject matter selected in block 715 (e.g., basketball). In block 738, the server application 180 may examine status updates generated by the User I and extract the most prominent keywords and phrases from those status updates. If the most prominent keywords in the User I's status updates are "basketball" and/ or the names of professional basketball players, the server application 180 may infer that the User I is interested in basketball. The User I's social data may be analyzed and grouped (or clustered) using machine learning techniques to infer a level of interest of the User I in the type of subject matter (e.g., basketball). By way of another non-limiting example, "natural language processing," or other techniques (e.g., artificial intelligence techniques) may be used to infer a level of interest of the User I in the type of subject matter (e.g., basketball).

If the User I is interested in basketball, the User I's importance rating of the User C may reflect the User I's belief that the User C has expertise with respect to basketball. In this situation, the User C's social rank value may be increased with respect to the type of subject matter corresponding to basketball. For example, if the User C has a social rank value of 0 in block 725, in block 738, the User C's social rank value may be increased by a predetermined amount. By way of a non-limiting example, the User C's social rank value may be increased by 1 to 1. By way of another non-limiting example, the User C's social rank value may be increased by the importance value that the User I assigned to the User C.

Optionally, the social rank value of the member identified in block 735 (e.g., the User I) may be considered when evaluating the social rank value of the member selected in block 705 (e.g., the User C). For example, if the User I has a social rank value equal to 5 with respect to the type of subject matter selected in block 715 (e.g., basketball), and has assigned an importance value equal to 8 to the User C, the server application 180 may increase the social rank value of the User C as a function of the User I's social rank value and the importance rating the User I assigned to the User C. For example, the server application 180 may increase the social rank value of the User C by the product of the User I's social rank value and the importance rating the User I assigned to the User C (5*8=40), the sum of the User I's social rank value and the importance rating the User I assigned to the User C (5+8=13), and the like.

On the other hand, if the User I is not interested in basketball, the User I's importance rating of the User C may be independent of the User C's expertise with respect to basketball. In this situation, the User C's social rank value may remain unchanged or may be decreased with respect to the type of subject matter corresponding to basketball. For example, if the User C has a social rank value of 0 in block 725, in block 738, the User C's social rank value may be decreased by a predetermined amount. By way of a non-limiting example, the User C's social rank value may be decreased by 1 to −1. Alternatively, the User C's social rank value may remain unchanged.

In decision block 740, the server application 180 determines whether additional members (other than the User I) were identified in block 735. The decision in decision block 740 is "YES" when additional members were identified. Otherwise, the decision in decision block 740 is "NO" when additional members were not identified. When the decision in decision block 740 is "YES," the server application 180 returns to block 735 to select a different member. On the other hand, when the decision in decision block 740 is "NO," the server application 180 advances to block 742.

In block 742, the server application 180 assigns a social rank value to the member (e.g., the User C) selected in block 705 with respect to the type of subject matter (e.g., basketball) selected in block 715. For example, the social rank value may be assigned based on a scale having a predetermined range (e.g., from 0 to 10). Alternatively, the social rank value may be any finite numeric value.

In decision block 744, the server application 180 determines whether additional types of subject matter (e.g., a subject matter other than basketball) were identified in block 710. The decision in decision block 744 is "YES" when additional types were identified. Otherwise, the decision in decision block 744 is "NO" when additional types were not identified. When the decision in decision block 744 is "YES," the server application 180 returns to block 715 to select a different type of subject matter. On the other hand, when the decision in decision block 744 is "NO," the method 700 terminates.

At this point, for one or more particular types of subject matter and a particular member (e.g., the User C) of the social network, the method 700 has determined a social rank value that may be used to select and/or sort search results returned in response to a web search initiated by the user (e.g., the User A) associated with the social network. The method 700 may be repeated for each member of the social network.

Figure 9B:
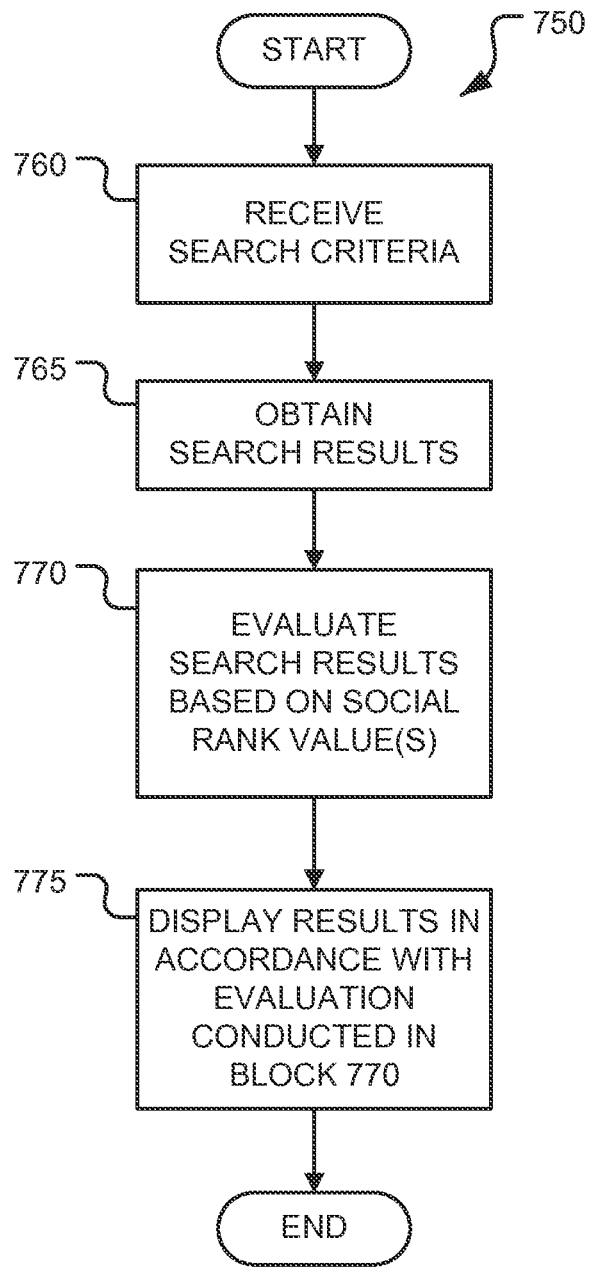
FIG. 9B is a flow diagram of a method of using the social rank values determined by the method of FIG. 9A to evaluate and display search results returned by a web search.

FIG. 9B is a flow diagram of a method 750 of using the social rank values determined by the method 700 to evaluate and display search results returned by a web search. For ease of illustration, the Users B and C have been assigned social rank values of 10 and 1, respectively, with respect to the type of subject matter related to restaurants.

In first block 760, the client application 160 receives search criteria (e.g., one or more search terms) from the user. For ease of illustration, in this example, the User A will be described as conducting the web search. Further, the User A will be described as conducting a search for a restaurant in a particular city (e.g., Seattle). Thus, the exemplary search criteria received by the client application 160 may include search terms such as "restaurant" and "Seattle."

In block 765, the server application 180 obtains search results using the search criteria received in block 760. Thus, in block 765, the client application 160 forwards the search criteria to the server application 180 and the server application conducts a web search using the search criteria. The web search may be conducted by the social search application 186 of the server application 180. Alternatively, the web search may be conducted by a search engine (e.g., a search engine operated by Google, Yahoo, and the like) that returns the search results to the server application 180. In the example where the User A is searching for a restaurant in Seattle, the search results may identify two restaurants: Restaurant A, and Restaurant B.

In block 770, the server application 180 evaluates the search results obtained in block 765 based on at least one social rank value assigned to a member of the social network. Thus, in block 770, the server application 180 identifies a type of subject matter associated with the search criteria received in the block 760. Then, the server application 180 obtains the social rank value assigned to one or more members of the social network for the type of subject matter identified. As mentioned above, in this example, the Users B and C were assigned social rank values of 10 and 1, respectively, with respect to the type of subject matter identified ("restaurants").

The evaluation process may assign points to each of the search results that may be used to filter and/or sort the results. Continuing the above example, the User B has "voted up" the Restaurant A and the User C has "voted up" the Restaurant B. Since the User B was assigned a social rank value equal to 10, the User B's rating will be given more weight than the User C's rating (who has a social rank value equal to 1). Therefore, in block 770, the search results may be ranked or ordered based on the social rank values assigned to the Users B and C as follows:

1. Restaurant A; and
2. Restaurant B.

The ratings (e.g., "voting up") used in block 770 may have been obtained via the rating interface 500 illustrated in FIG. 6A. Alternatively, a rating mechanism may be presented next to each search result The server application 180 may assign a point value to each search result. Point values may be determined by the level of expertise exhibited by the user(s) who voted on a search result with respect to the type of subject matter. For example, if the User B "Likes" the Restaurant A, the server application 180 may assign 10 points to the Restaurant A because the User B has a social rank value equal to 10 with respect to the type of subject matter. Alternatively, the points may be calculated as a multiple of the social rank value and/or may be combined with other factors. Likewise, if the User C "Likes" the Restaurant C, the server application 180 may assign 1 point to the Restaurant C because the User C has a social rank value equal to 1.

In the example illustrated in FIG. 7, both the Users B and C indicated they "Like" the Restaurant B. Thus, the Restaurant B may be assigned 11 points by the server application 180. In this example, when the User A performs the search, the search results may be ordered as follows in block 770:

1. Restaurant B;
2. Restaurant A; and
3. Restaurant C.

If the search results were assigned points based on proximity ratings, importance ratings, and/or compatibility ratings, in block 770, the points based on the social rank values may be included therewith (e.g., the points based on the social rank values may be added thereto).

In block 775, at least a portion of the search results obtained in block 765 are displayed to the user who requested the web search in accordance with the evaluation performed in block 770. For example, the search results including Restaurants A, B, and C may be displayed in the order indicated above: (1) Restaurant B; (2) Restaurants A; and (3) Restaurants C. After block 775, the method 750 terminates.

In the method 750, "experts" (members having high social rank values) may be given additional weight (e.g., higher social rank values). In some embodiments, experts may be the only ones assigned sufficiently high social rank values to influence the evaluation of the search results (conducted in block 770) related to their areas of expertise. For example, the User B may be a food critic or other type of restaurant expert. In some embodiments, only the ratings provided by the User B may be considered in block 770. Thus, in the example illustrated in FIG. 7, only Restaurants A and B would be assigned point values.

By way of another non-limiting example, John Doe may be an expert on law. Because laymen may not be experts in law, John Doe and other lawyers may be given additional weight or be the only ones assigned sufficiently high social rank values (and, thus the only ones allowed to influence the evaluation of the search results related to legal compatibility topics). In some embodiments, only experts may be allowed to influence the evaluation of the search results even if the search criteria is unrelated to the expert's area of expertise.

The method 700 may be used to identify expertise with respect to one or more types o subject matter. Alternatively or in addition, expertise may be determined by "votes" received from users with respect to a type of subject matter. For example, if the type of subject matter is law, a list of lawyers may be displayed to users. By way of a non-limiting example, an entire directory may be dedicated to lawyers. Users can rank the lawyers in the list such that the highest rated lawyers will have the highest social rank value. Likewise, the lowest rated lawyers (and laymen) will have little to no social rank value.

In some embodiments, the server application 180 and/or the client application 160 may generate a user interface substantially similar to the importance rating interface 530 illustrated in FIG. 6B but configured to allow users to manually define experts and manually vote for, rank or sort them. It may not always be ideal to present a "like/dislike" interface (such as the "like/dislike" interface 520 illustrated in FIG. 6A) as this type of interface may not allow a user to distinguish a favorite item of interest (e.g., a favorite restaurant) from a merely above average item of interest (e.g., a merely above average restaurant). Furthermore, a 5 star rating system usually results in ratings of either 5 stars or 1 star. Therefore, a sortable list with rankable items may also be used to avoid these issues.

When ranking search results using social data obtained from a large number of users (or the "masses") that includes people the user may not necessarily be friends or acquaintances with and may have never met or heard of, it may be preferable to use the opinions of experts. In the method 700, a member's social rank value may be determined by aggregating the member's ratings from multiple users. The aggregated social rank value is a measure of a particular user's overall voting power with respect to a type of subject matter across all users (not just as it pertains to the User A). As explained above, importance rating (as well as compatibility ratings, and proximity ratings) may be used to calculate a member's social rank value. A user who has been assigned a high importance rating (e.g., an importance value=10) by many other users may be deemed (e.g., by the method 700) to be more trusted and valued by the masses with respect to one or more types of subject matter.

In some embodiments, it may be desirable to determine a particular member's overall social rank value for all types of subject matter. Such a measure may be calculated, for example, by summing or averaging the importance ratings assigned to the particular member by all members following the particular member and/or all members followed by the particular member. However, other calculations could be used. For example, the particular member's overall social rank value could be a median of the importance ratings assigned to the particular member by all members following the particular member and all members followed by the particular member.

However, an overall social rank value provides only a general measure of the particular member's credibility. A particular member having a large overall social rank value because the particular member is an expert in cooking may not be an expert in law. Therefore, the particular member's groups, status updates, friends/contacts/followers, and other social data may be analyzed or used to determine the particular member's area(s) of expertise. For example, a lot of status updates about football from the particular member along with thousands of "followers" also posting status updates about football (or a related keyword such as "sports") can imply the particular member is an "expert" at football, and any "likes" or ratings provided by this user in the football or related keywords/categories (such as "sports") should be given extra weight. Therefore, a celebrity chef "liking" and thereby "voting up" a recipe will provide much more "voting power" than a cook who is new to the field with little credibility. However, the same celebrity chef may not experience the same level of voting power when "voting up" a technology news article.

To prevent spam, other factors may be used to determine voting power and social rank value such as the registration date, login dates, level of activity, the originality of content, etc. of the user and/or the user's friends and contacts.

The social rank value may be "capped" or limited to prevent abuse. For example, social rank values may be limited to a scale of 1-1000 with movement up the scale being exponentially more difficult. For example, moving from 1 to 2 may be easier than moving from 999 to 1000.

A member's social rank value may also be distributed. For example, if a member has a social rank value of 10 and "votes up" five different web pages, each of those pages may be assigned 2 points (in this case, the social rank value has been distributed evenly but this is not a requirement) instead of being given 10 points each.

Furthermore, when ranking search results with data from the masses, the aforementioned "compatibility" method may be used. However, when dealing with the masses, compatibility may be determined with respect to complete strangers that are not friends, contacts, or friends of friends.

Method of Evaluating Search Results

After the methods 300, 370, 390, 395, 600, and 700 have been performed, each member of the social network has been assigned an importance rating (which may include an importance value and/or an importance rank), a proximity rating (which may include a graph distance value and/or a physical distance value), a compatibility rating (with respect to a compatibility topic), and a social rank value (with respect to a type of subject matter).

Optionally, only the importance ratings, the proximity ratings, the compatibility ratings, and the social rank values that are statistically significant may be used.

Figure 10:
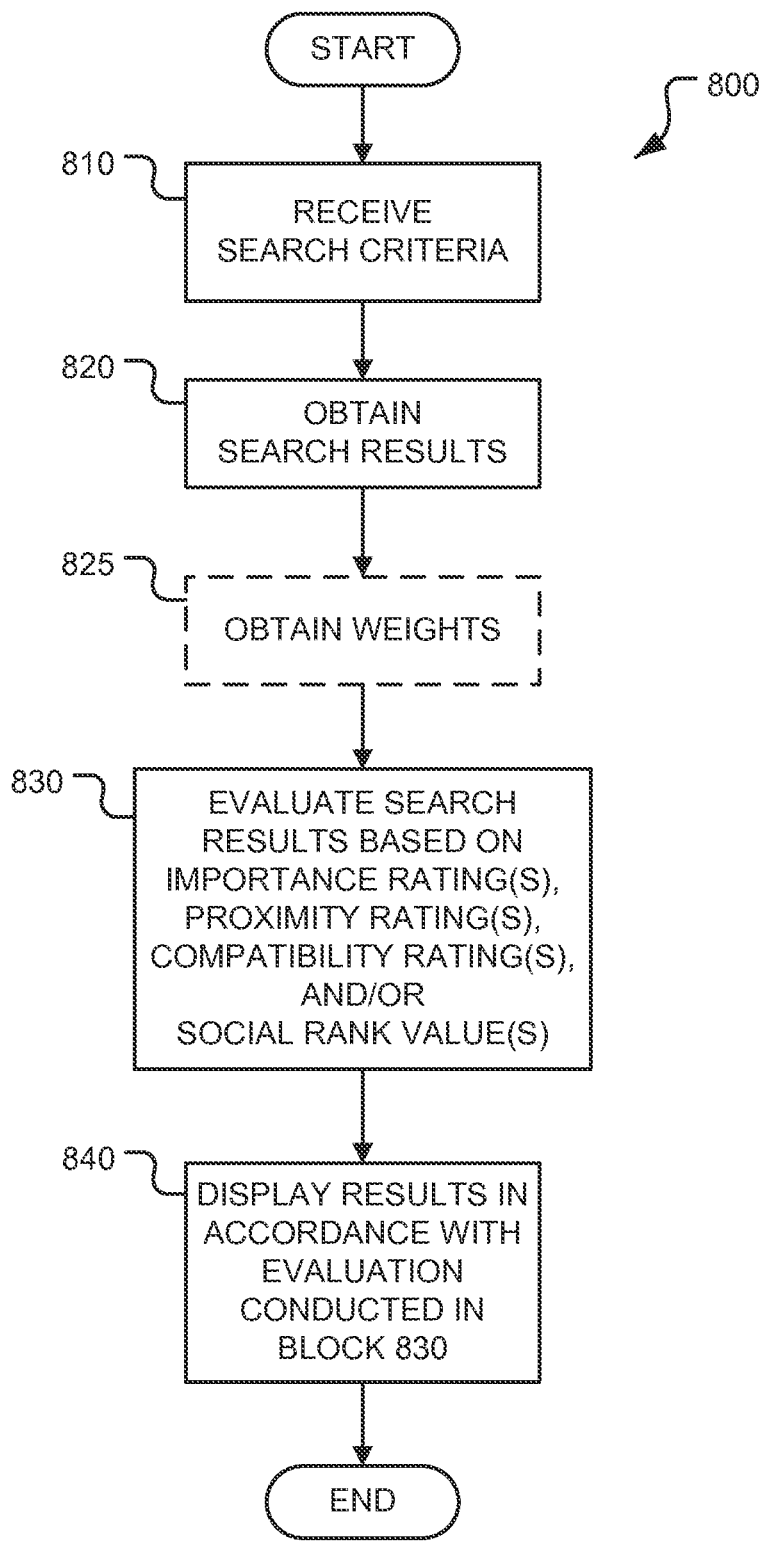
FIG. 10 is a flow diagram of a method that uses importance rating(s), proximity rating(s), compatibility rating(s), and/or social rank value(s) to evaluate and display web search results.

FIG. 10 is a flow diagram of a method 800 that uses importance rating(s), proximity rating(s), compatibility rating(s), and/or social rank value(s) to evaluate and display web search results.

In first block 810, the client application 160 receives search criteria (e.g., one or more search terms) from the user. For ease of illustration, in this example, the User A will be described as conducting the search. Further, the User A will be described as conducting a search for a restaurant in a particular city (e.g., Seattle). Thus, the exemplary search criteria received by the client application 160 may include search terms such as "restaurant" and "Seattle."

In block 820, the server application 180 obtains search results using the search criteria received in block 810. Thus, in block 820, the client application 160 forwards the search criteria to the server application 180, and the server application conducts a web search using the search criteria. The web search may be conducted by the social search application 186 of the server application 180. Alternatively, the web search may be conducted by a search engine (e.g., a search engine operated by Google, Yahoo, and the like) that returns the search results to the server application 180.

In optional block 825, weights may be obtained for the importance rating, the proximity rating, the compatibility rating, and the social rank value. The weights may be determined manually by the User A. Alternatively, predetermined weights may be specified. By way of a non-limiting example, equal weights may be used. In such an embodiment, the importance rating of a member is considered to be equally as relevant as the proximity rating assigned to the member, the compatibility rating assigned to the member with respect to the compatibility topic associated with the search criteria, and the social rank value assigned to the member with respect to the type of subject matter associated with the search criteria. However, non-equal weighting may be used. In some embodiments, weights are omitted.

Non-equal weighting may be used to emphasize at least one of the importance ratings, proximity ratings, compatibility ratings, and/or social rank values over the others. For example, the User A may value the opinions of a group of technology friends when searching for a new computer to buy but may value the opinions of other (e.g., best) friends more when searching for a new movie to watch. Thus, when the compatibility topic and the type of subject matter is "computers," the weight assigned to the importance rating may be less than the weights assigned to the proximity rating, the compatibility rating, and the social rank value. On the other hand, when the compatibility topic and the type of subject matter is "new movies," the weight assigned to the importance rating may be greater than the weights assigned to the proximity rating, the compatibility rating, and the social rank value.

When ranking search results with data from the masses, it may be preferable to use the opinions of experts. In this example, for all compatibility topics and types of subject matter, the weight assigned to the social rank value may be greater than the weights assigned to the proximity rating, the compatibility rating, and the importance rating. As mentioned above, the social rank values may be determined based at least in part on information, data, rankings, and votes from the masses. Further, when ranking data from the masses, the user's friends' ratings and contacts' ratings may be given more weight. Thus, for all compatibility topics and types of subject matter, the weight assigned to the importance rating and/or the weight assigned to the proximity rating may be greater than the weight assigned to the compatibility rating.

One or more of the importance rating, the proximity rating, the compatibility rating, and the social rank value may be omitted by setting the corresponding weight(s) equal to zero. Thus, one or more of these values may be used simultaneously, one at a time, in an arbitrary order, etc. to influence the selection and/or ranking of the search results.

In block 830, the server application 180 evaluates the search results obtained in block 820 based on the importance rating, the proximity rating, the compatibility rating, the social rank value, and optionally, the weights assigned thereto. Thus, in block 830, the server application 180 identifies both a compatibly topic and a type of subject matter associated with the search criteria received in the block 810. If appropriate, the server application 180 may identify a physical location for use with the physical distance value subcomponent of the proximity rating. Then, the server application 180 obtains the relevant importance rating(s), the relevant proximity rating(s), the relevant compatibility rating(s), the relevant social rank value(s) and uses them to determine which of the search results should be displayed and in which order.

Further, as described with respect to the methods 200 and 250, social data may be sorted using categories defined with respect to a "followed" user and groups created by (or for) a "following" user. These categories and groups may also be used to provide more specific sorting and ranking of the search results.

The evaluation process of block 830 may assign points to each of the search results that may be used to filter and/or sort the results. For example, for each search result, a member score may be calculated for each member. The member scores may be totaled to produce a point value for the search result. By way of a non-limiting example, for each member, the member score may be calculated by multiplying the importance rating, the proximity rating, the compatibility rating, and the social rank value assigned to the member by the appropriate weights to produce a measure of the member's voting power with respect to the search results. Then, this measure is used along with the member's rating of the search result (e.g., "Liked" or "Disliked") to determine the member score. For example, if equal weights are used, the member's importance rating is "1," proximity rating is "3," compatibility rating is "2," and social rank value is "6," the member's voting power with respect to the search results is 3. Therefore, if the member "Liked" the search result, the member score of 3 may be used.

Alternatively, in some embodiments, the weights may be omitted. As discussed above with respect to the methods 400, 450, 650, and 750, a point value may be assigned to each search result based on the importance ratings, proximity ratings, compatibility ratings, and/or social rank values. The point values may be combined (e.g., added together) to obtain a total number of points for each search result.

The point values assigned to the search results may be used to sort the search results. Further, a threshold value may be used to select only search results having a point value greater than the threshold value.

In block 840, at least a portion of the search results obtained in block 820 are displayed to the user who requested the web search in accordance with the evaluation performed in block 830. After block 840, the method 800 terminates.

Whenever a user (e.g., the User A) and/or a member of the social network (e.g., the User C) is ranking or rating items of interest, sortable lists may be used. Sortable lists may provide more precision for organizing data and search results. The user may do this sorting within the search results interface (for convenience) or a separate interface/page.

As explained above, several types of categories and groups may be used by the system 100. For example, a "followed" user may organize social data sent by the "followed" into categories; a "following" user may organize social data received from a "followed" user into groups; social data may be organized into compatibility topics for the purposes of assigning compatibility ratings to members; and social data may belong to type of subject matter for the purposes of assigning social rank values to members. For each of these groupings, the user and/or members of the social network, as appropriate, may be allowed to sort items within the grouping using a sortable list. Thus, multiple sortable lists may be used for each category or subcategory. For example, Hotel A may be sorted highest for "customer service" while Hotel C may be rated highest for "comfort."

Social data related to the User A may be determined automatically and used to determine preferences. For example, the server application 180 may calculate a number of times a user visited a particular restaurant, checked into a particular hotel, or performed any type of action with respect to an item of interest that may be used to infer a preference for that item.

As mentioned above, the server application 180 may analyze the User A's social data to identify preferences for items of interest. For example, the User A's social data may be analyzed to determine a number of occurrences of a hotel's name, or other relevant keywords.

Rankings and ratings determined by the methods described above may be added, modified, deleted, cleared entirely, etc. at any time.

The above methods are not restricted to search and can be applied to advertising, classifieds, coupons, promotions, directories, local business listings, music, business directories, videos, multimedia, media, files, data, applications, software, games, travel, web browsing and bookmarks, products, services, and the like.

Computing Device

Figure 11:
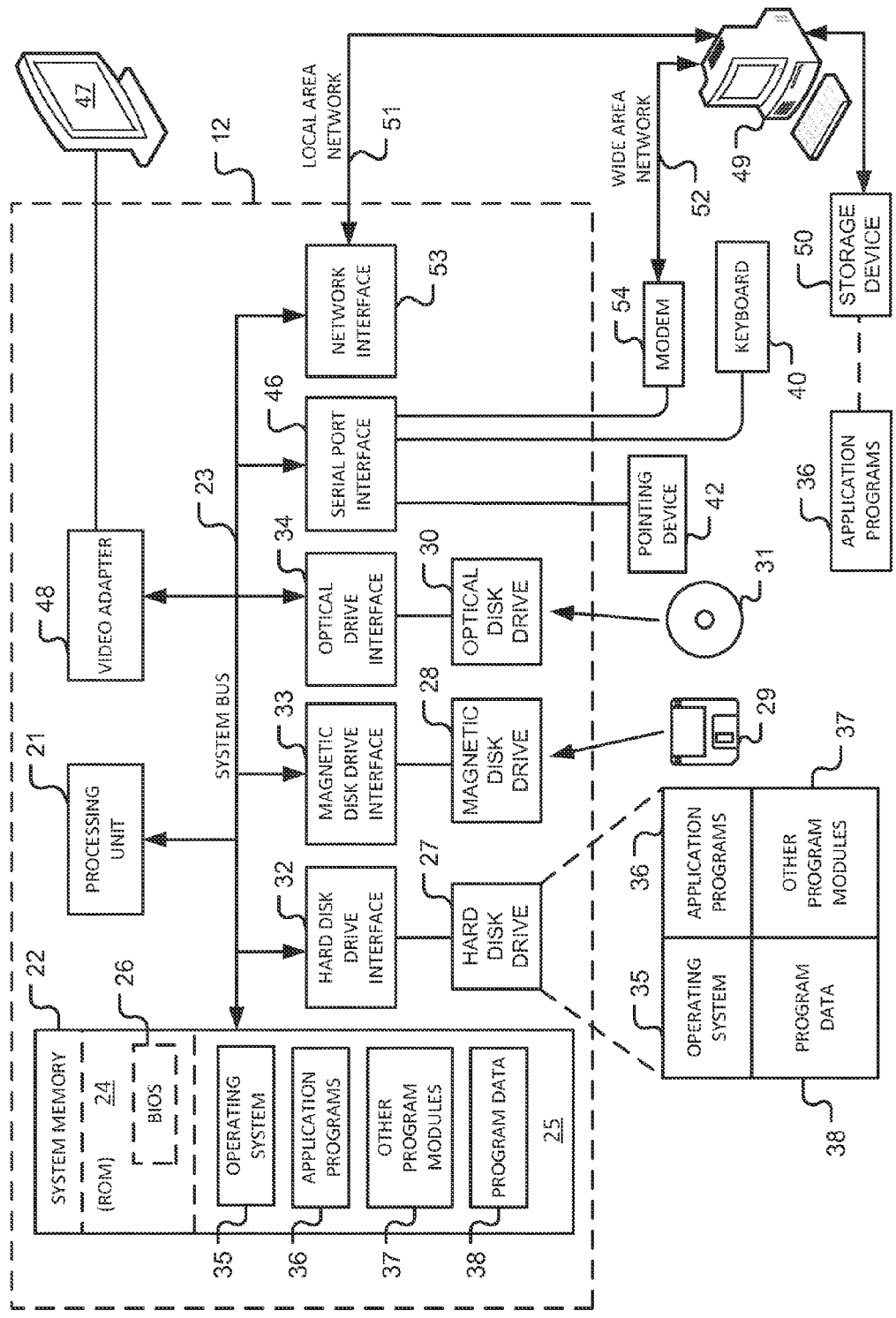
FIG. 11 is a diagram of a hardware environment and an operating environment in which each of the computing devices of the system of FIG. 1 may be implemented.

FIG. 11 is a diagram of hardware and an operating environment in conjunction with which implementations of the computing devices 130A-130E and/or the server 150 may be practiced. The description of FIG. 11 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 11 includes a general-purpose computing device in the form of the computing device 12. Each of the computing devices 130A-130E and/or the server 150 may be substantially identical to the computing device 12. In FIG. 2A, the computing device 130C is illustrated as being a cellular telephone and the computing devices 130A, 130B, 130D, and 130E are illustrated as being implemented by desktop personal computers. By way of other non-limiting examples, the computing device 12 may be implemented as a laptop computer, a tablet computer, a web enabled television, a personal digital assistant, a game console, a smartphone, a mobile computing device, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feed back game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 11 include a local-area network (LAN) 51 and a wide-area network (WAN) 52. Such networking environments are commonplace in offices, enterprise-wide computer networks, intranets and the Internet. The network 140 may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods 200, 250, 300, 350, 370, 390, 395, 400, 450, 600, 650, 700, 750 and 800 illustrated in FIGS. 3A, 3B, 4A, 4B, 4C, 4D, 4E, 5A, 5B, 8A, 8B, 9A, 9B, and 10, respectively, and described above. Such instructions may be stored on one or more non-transitory computer-readable media.

In some embodiments, the system memory 22 stores computer executable instructions that when executed by one or more processors implement the client application 160 and/or the server application 180. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer-implemented method performed by one or more computing devices and comprising:
   (A) obtaining a social graph associated with a particular user, the social graph comprising a plurality of nodes each representing a different user and being associated with voting values associated with a plurality of items of interest, a particular one of the plurality of nodes representing the particular user, ones of the plurality of nodes connected directly to the particular node without any intervening nodes being connected therebetween having first degree connections to the particular node;
   (B) obtaining, from the particular user, an importance rating for each of the plurality of nodes other than the particular node, a first importance rating being obtained for a first node having a first degree connection to the particular node, a second importance rating being obtained for a second node having a first degree connection to the particular node, the first importance rating being different from the second importance rating;
   (C) receiving search criteria from the particular user;
   (D) conducting a search using the search criteria to obtain search results;
   (E) identifying at least one of the plurality of items of interest in the search results;
   (F) determining a sort value for each of the search results in which at least one of the plurality of items of interest was identified, the sort value being determined for each of the search results in which at least one of the plurality of items of interest was identified by:
      (i) identifying one or more nodes of the social graph associated with a voting value associated with any of the plurality of items of interest identified in the search result;
      (ii) determining a node value for each node identified based at least in part on the importance rating obtained for the node and the voting value associated with both the node and any of the plurality of items of interest identified in the search result; and
      (iii) determining the sort value for the search result based at least in part on the node value determined for each node identified;
   (G) ordering the search results based at least in part on the sort value determined for each of the search results in which at least one of the plurality of items of interest was identified; and
   (H) generating a user interface including the ordered search results that is displayable to the particular user via a display device.

2. The method of claim 1, wherein the importance rating obtained from the particular user for each of the plurality of nodes other than the particular node is obtained by receiving input from the particular user.

3. The method of claim 2, wherein for each node within at least a portion of the nodes, the input is received from the particular user when the particular user follows an entity represented by the node.

4. The method of claim 2, wherein the input received from the particular user comprises a numerical importance value for each of the plurality of nodes.

5. The method of claim 2, wherein the input received from the particular user comprises a node order that ranks the plurality of nodes other than the particular node in accordance with importance to the particular user.

6. The method of claim 2, wherein for each node within at least a portion of the nodes, the input is received from the particular user when the particular user accepts a friend request from an entity represented by the node, or the particular user sends a friend request to the entity represented by the node.

7. The method of claim 1, further comprising:
obtaining a proximity rating for each of the plurality of nodes other than the particular node, the proximity rating indicating at least one of (1) a distance between the node and the particular node on the social graph, or (2) a physical distance between an entity represented by the node and the particular user,
wherein for each of the search results in which at least one of the plurality of items of interest was identified, the node value for each node identified is based at least in part on the proximity rating associated with the node.

8. The method of claim 7, further comprising:
obtaining a compatibility rating for each of the plurality of nodes other than the particular node based on an analysis of similarity between social data associated with the particular user and social data associated with the node,
wherein for each of the search results in which at least one of the plurality of items of interest was identified, the node value for each node identified is based at least in part on the compatibility rating associated with the node.

9. The method of claim 1, further comprising:
obtaining a compatibility rating for each of the plurality of nodes based on an analysis of similarity between social data associated with the particular user and social data associated with the node,
wherein for each of the search results in which at least one of the plurality of items of interest was identified, the node value for each node identified is based at least in part on the compatibility rating associated with the node.

10. The method of claim 1, further comprising:
identifying a compatibility topic;
for each node, obtaining a compatibility rating for the compatibility topic based on an analysis of similarity between social data associated with the particular user and social data associated with the node;
determining whether the search criteria is related to the compatibility topic;
obtaining a proximity rating for each of the plurality of nodes, the proximity rating indicating at least one of (1) a distance between the node and the particular user on the social graph, or (2) a physical distance between an entity represented by the node and the particular user;
identifying a type of subject matter;
identifying each of at least a portion of the plurality of nodes as a followed node, each followed node being followed by at least one other of the plurality of nodes in the social graph, a social rank value having been assigned to each followed node for the type of subject matter;
for each followed node, identifying one or more of the plurality of nodes that are following the followed node;
for each followed node, (1) analyzing social data associated with the one or more of the nodes following the followed node to determine whether any of the one or more following nodes are interested in the type of subject matter; and (2) increasing the social rank value assigned to the followed node for the type of subject matter if it is determined that any of the one or more following nodes are interested in the type of subject matter; and
determining whether the search criteria is related to the type of subject matter;
wherein for each of the search results in which one of the plurality of items of interest was identified:
(i) the node value for each node identified is based at least in part on the proximity rating associated with the node,
(ii) if it is determined that the search criteria is related to the compatibility topic, the node value for each node identified is based at least in part on the compatibility rating associated with the node and the compatibility topic, and
(iii) if it is determined that the search criteria is related to the type of subject matter, the node value for each node identified is based at least in part on the social rank value assigned to the node for the type of subject matter.

11. The method of claim 10, wherein increasing the social rank value assigned to the followed node for the type of subject matter when it is determined that any of the one or more following nodes are interested in the type of subject matter comprises:
identifying one or more of the interested following nodes which has assigned an importance rating to the followed node as rated nodes;
for each rated node, (1) calculating an increase amount as a function of the importance rating assigned by the rated node to the followed node, and (2) increasing the social rank value assigned to the followed node for the type of subject matter by the increase amount.

12. The method of claim 10, wherein increasing the social rank value assigned to the followed node for the type of subject matter when it is determined that any of the one or more following nodes are interested in the type of subject matter comprises:
identifying one or more of the interested following nodes which has assigned an importance rating to the followed node as rated nodes;
for each rated node, (1) calculating an increase amount as a function of the importance rating assigned by the rated node to the followed node, and the social rank value of the rated node, and (2) increasing the social rank value assigned to the followed node for the type of subject matter by the increase amount.

13. A computer-implemented method performed by one or more computing devices, the method comprising:
(A) obtaining a social graph associated with a particular user, the social graph comprising a plurality of nodes each representing a different user and being associated with voting values associated with a plurality of items of interest, a particular one of the plurality of nodes representing the particular user, ones of the plurality of nodes connected directly to the particular node without any intervening nodes being connected therebetween having first degree connections to the particular node;
(B) obtaining, from the particular user, an importance rating for each of the plurality of nodes other than the particular node, a first importance rating being obtained for a first node having a first degree connection to the particular node, a second importance rating being obtained for a second node having a first degree connection to the particular node, the first importance rating being different from the second importance rating;
(C) identifying data;

(D) sorting the data based at least in part on the importance rating obtained for each of the plurality of nodes other than the particular node; and
(E) generating a user interface identifying the sorted the data that is displayable to the particular user via a display device.

14. The method of claim 13, wherein the data comprises status updates.

15. A computer-implemented method performed by one or more computing devices and comprising:
(A) obtaining a social graph associated with a particular user, the social graph comprising a plurality of nodes each representing a different user and being associated with voting values associated with a plurality of items of interest, a particular one of the plurality of nodes representing the particular user, ones of the plurality of nodes connected directly to the particular node without any intervening nodes being connected therebetween having first degree connections to the particular node;
(B) obtaining, from the particular user, a rating for each of the plurality of nodes other than the particular node, a first rating being obtained for a first node having a first degree connection to the particular node, a second rating being obtained for a second node having a first degree connection to the particular node, the first rating being different from the second rating;
(C) determining a social rank for each of the plurality of nodes other than the particular node based at least in part on the rating obtained for the node;
(D) receiving search criteria from the particular user;
(E) conducting a search using the search criteria to obtain search results;
(F) identifying at least one of the plurality of items of interest in the search results;
(G) determining a sort value for each of the search results in which at least one of the plurality of items of interest was identified, the sort value being determined for each of the search results in which at least one of the plurality of items of interest was identified by:
(i) identifying one or more nodes of the social graph associated with a voting value associated with any of the plurality of items of interest identified in the search result;
(ii) determining a node value for each node identified based at least in part on the social rank obtained for the node and the voting value associated with both the node and any of the plurality of items of interest identified in the search result; and
(iii) determining the sort value for the search result based at least in part on the node value determined for each node identified;
(H) ordering the search results based at least in part on the sort value determined for each of the search results in which at least one of the plurality of items of interest was identified; and
(I) generating a user interface including the ordered search results that is displayable to the particular user via a display device.

\* \* \* \* \*